United States Patent
Endres et al.

(10) Patent No.: US 6,979,790 B2
(45) Date of Patent: Dec. 27, 2005

(54) ROCKER PADDLE SWITCH WITH FLEXIBLE CAM DRIVER

(75) Inventors: Paul Endres, Plainview, NY (US); Stephen R. Kurek, Rego Park, NY (US); Anthony Tufano, North Massapequa, NY (US); Dennis A. Oddsen, Eatons Neck, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 10/858,688

(22) Filed: Jun. 1, 2004

(65) Prior Publication Data

US 2005/0109599 A1 May 26, 2005

Related U.S. Application Data

(63) Continuation-in-part of application No. 10/627,224, filed on Jul. 25, 2003.

(51) Int. Cl.[7] ............................................. H01H 13/00
(52) U.S. Cl. ...................... 200/339; 200/523; 200/6 R
(58) Field of Search ................................ 200/339, 6 R, 200/315, 553, 525, 523, 547

(56) References Cited

U.S. PATENT DOCUMENTS

| | | |
|---|---|---|
| 3,609,268 A | 9/1971 | Sanchez |
| 4,300,026 A | 11/1981 | Bull |
| 4,733,330 A | 3/1988 | Tanaka et al. |
| 4,835,343 A | 5/1989 | Graef et al. |
| 4,870,230 A * | 9/1989 | Osika et al. ................. 200/6 R |
| 4,899,018 A | 2/1990 | Sireci |
| 5,041,706 A | 8/1991 | Osika et al. |
| 5,107,072 A | 4/1992 | Morgan |
| 5,135,816 A | 8/1992 | Audett |
| 5,136,132 A * | 8/1992 | Kitchen ....................... 200/525 |

(Continued)

*Primary Examiner*—K. Lee
(74) *Attorney, Agent, or Firm*—Paul J. Sutton

(57) ABSTRACT

There is disclosed a paddle switch operated by pushing on the lower portion of a rocker paddle to turn the switch "on" or "off". The lower edge of the paddle pivots in and out about its upper edge. The switch includes flexible driver means coupled to be driven by the rocker paddle. When the rocker paddle is pushed in, it urges the flexible driver means to rotate a cam means in a first, clock wise direction, or a second, counter clock wise direction. Alternate rotation of the cam drives a slider member having a cam follower back and forth along a linear axis. A shaped leaf spring cooperates with the cam follower to assist in the movement of the slider and determines its rest positions. An indicator such as an LED is used to indicate the state of conduction of the switch. When the rocker paddle is released, it is biased by a spring to pivot back to its initial position. The rocker paddle of the switch is not located within a frame and has a surface along its vertical axis of positive first differential and zero second differential, comprised of a combination of splines which extend between points of varying distances from a datum plane. This surface has zero second differential when the rate of height increase of individual splines is constant.

29 Claims, 38 Drawing Sheets

U.S. PATENT DOCUMENTS

| | | |
|---|---|---|
| 5,180,886 A | 1/1993 | Dierenbach et al. |
| 5,189,259 A | 2/1993 | Carson et al. |
| 5,191,971 A * | 3/1993 | Hakkarainen et al. ...... 200/550 |
| 5,382,768 A | 1/1995 | Kurek et al. |
| 5,500,498 A | 3/1996 | Kurek et al. |
| 5,669,488 A * | 9/1997 | Burger ....................... 200/528 |
| 5,720,379 A * | 2/1998 | Schwartz et al. ........ 200/318.1 |
| 5,743,387 A * | 4/1998 | Hung ......................... 200/571 |
| 5,744,750 A | 4/1998 | Almond |
| 5,826,710 A | 10/1998 | Kurek et al. |
| 5,831,213 A | 11/1998 | Wright et al. |
| 6,118,234 A | 9/2000 | Marcellus et al. |

* cited by examiner

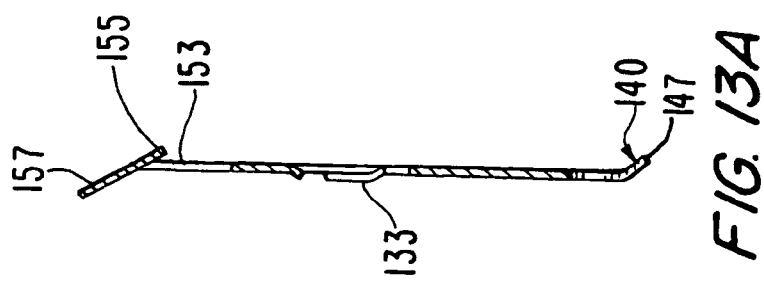
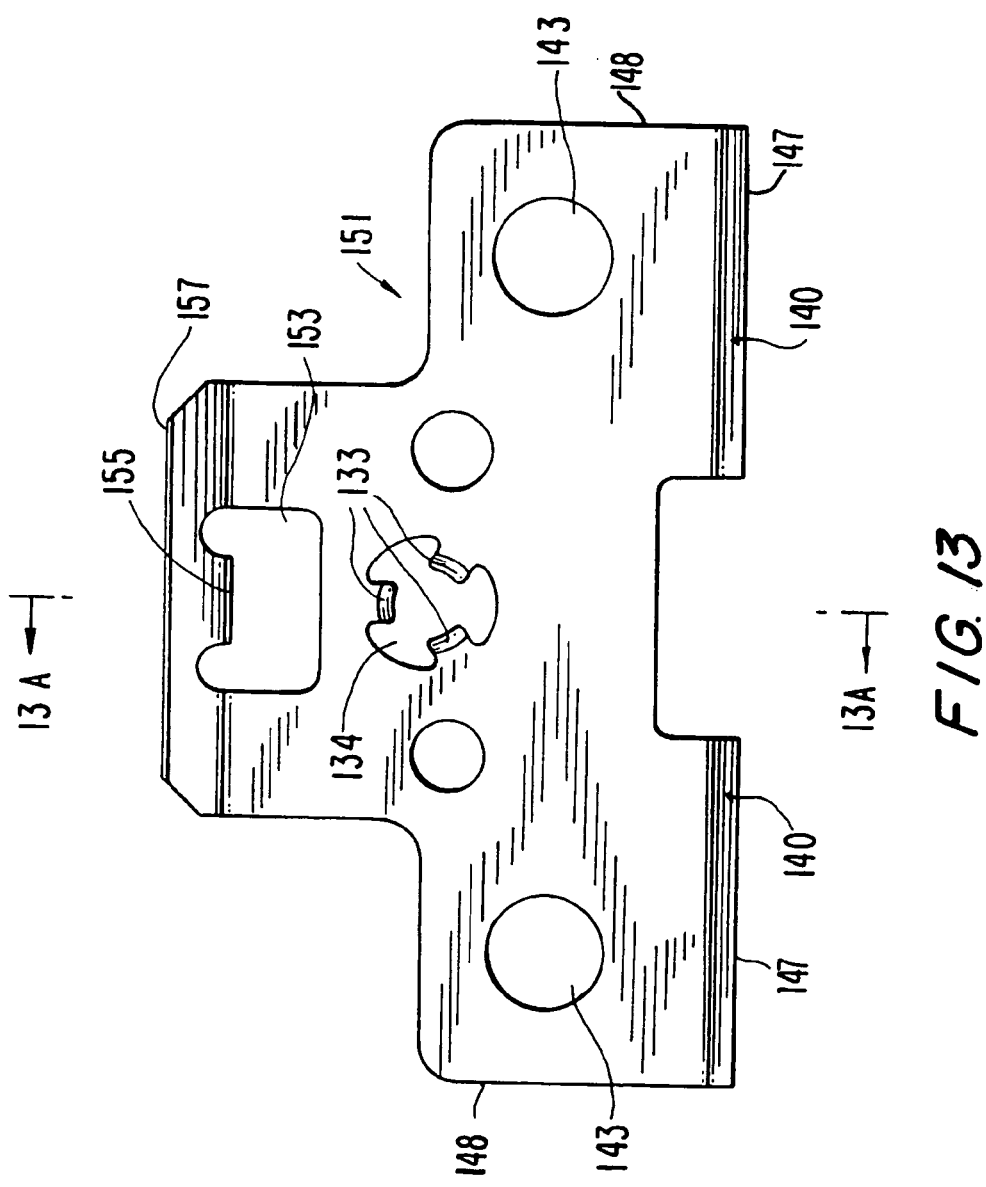

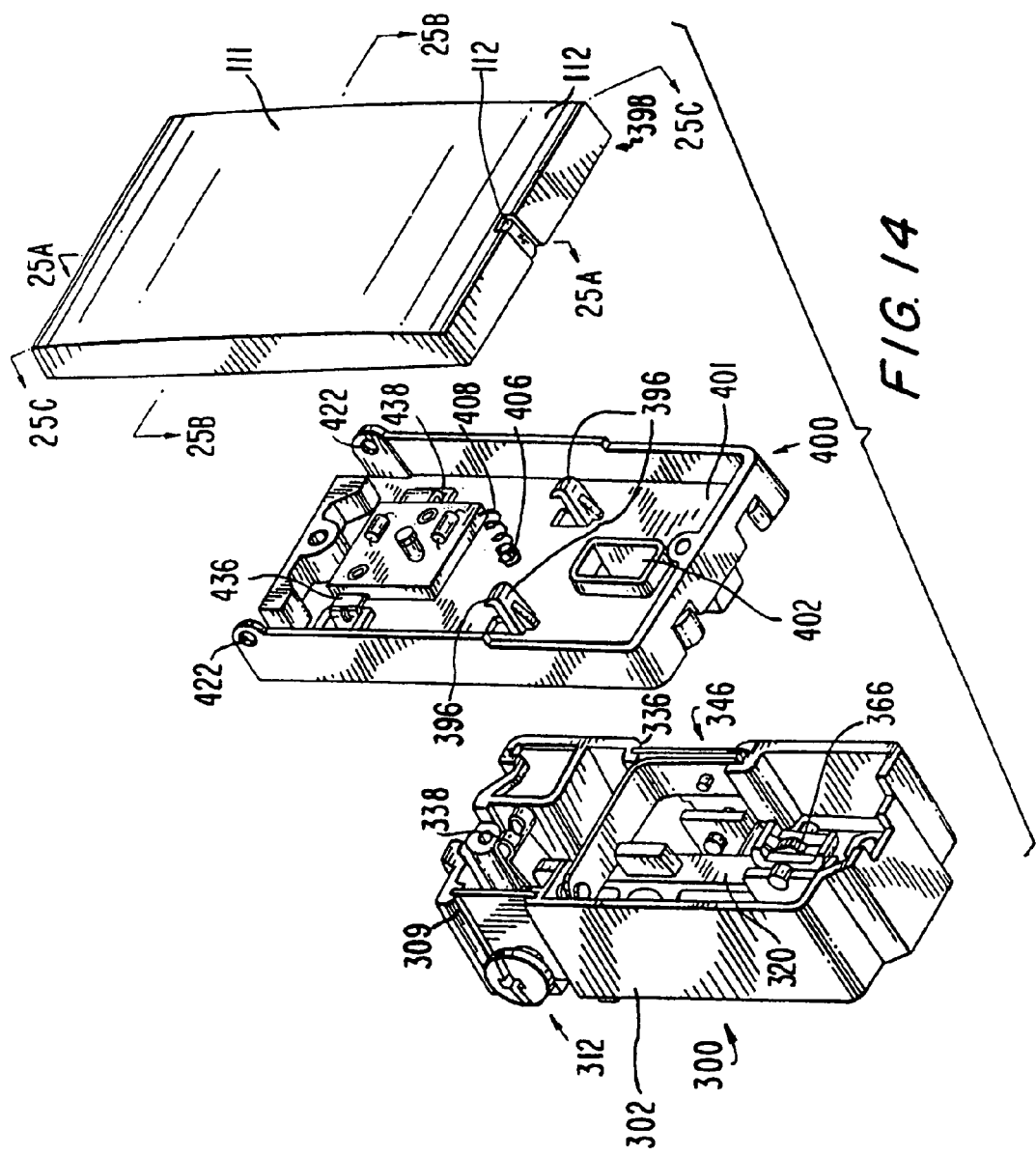

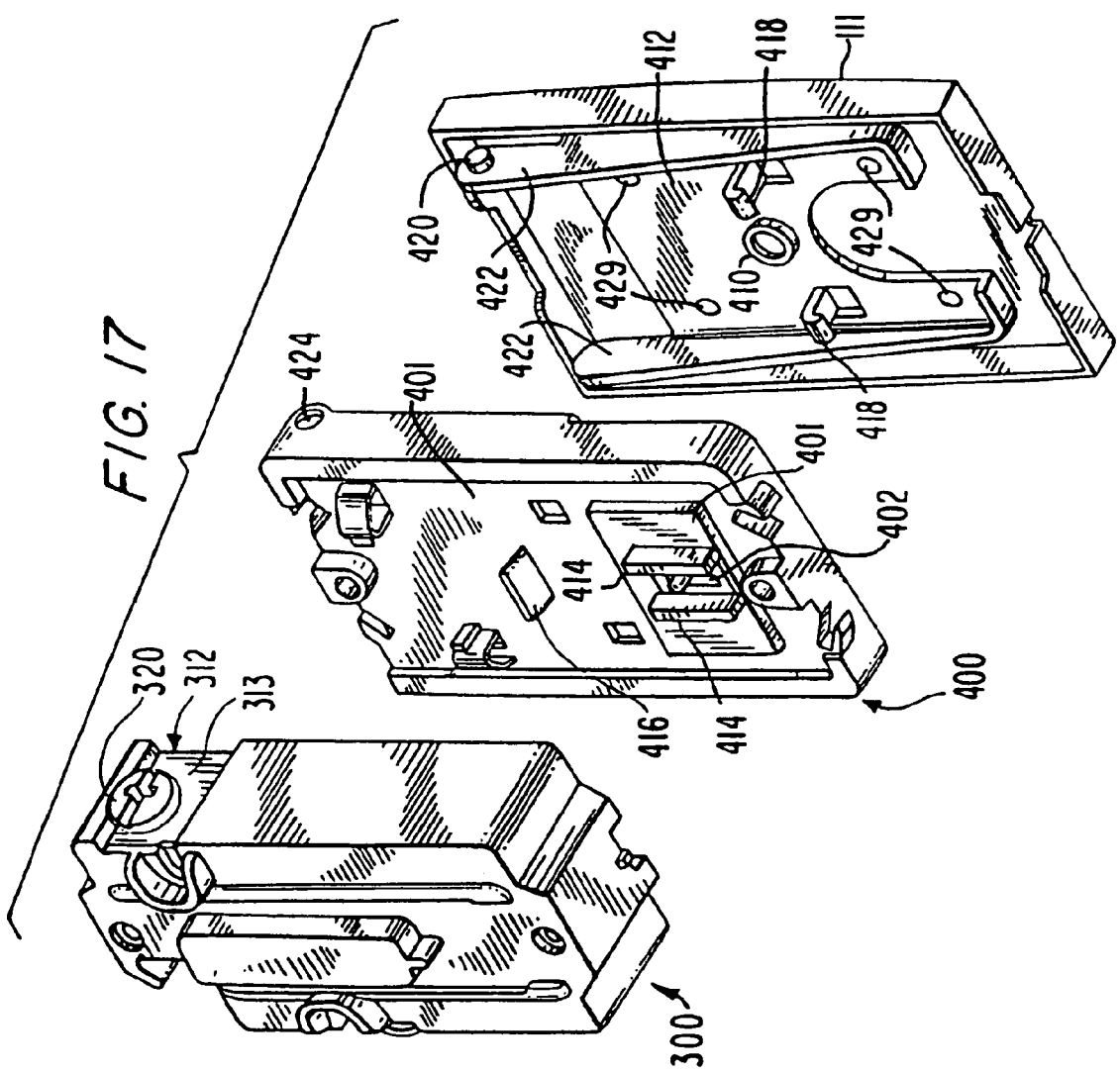

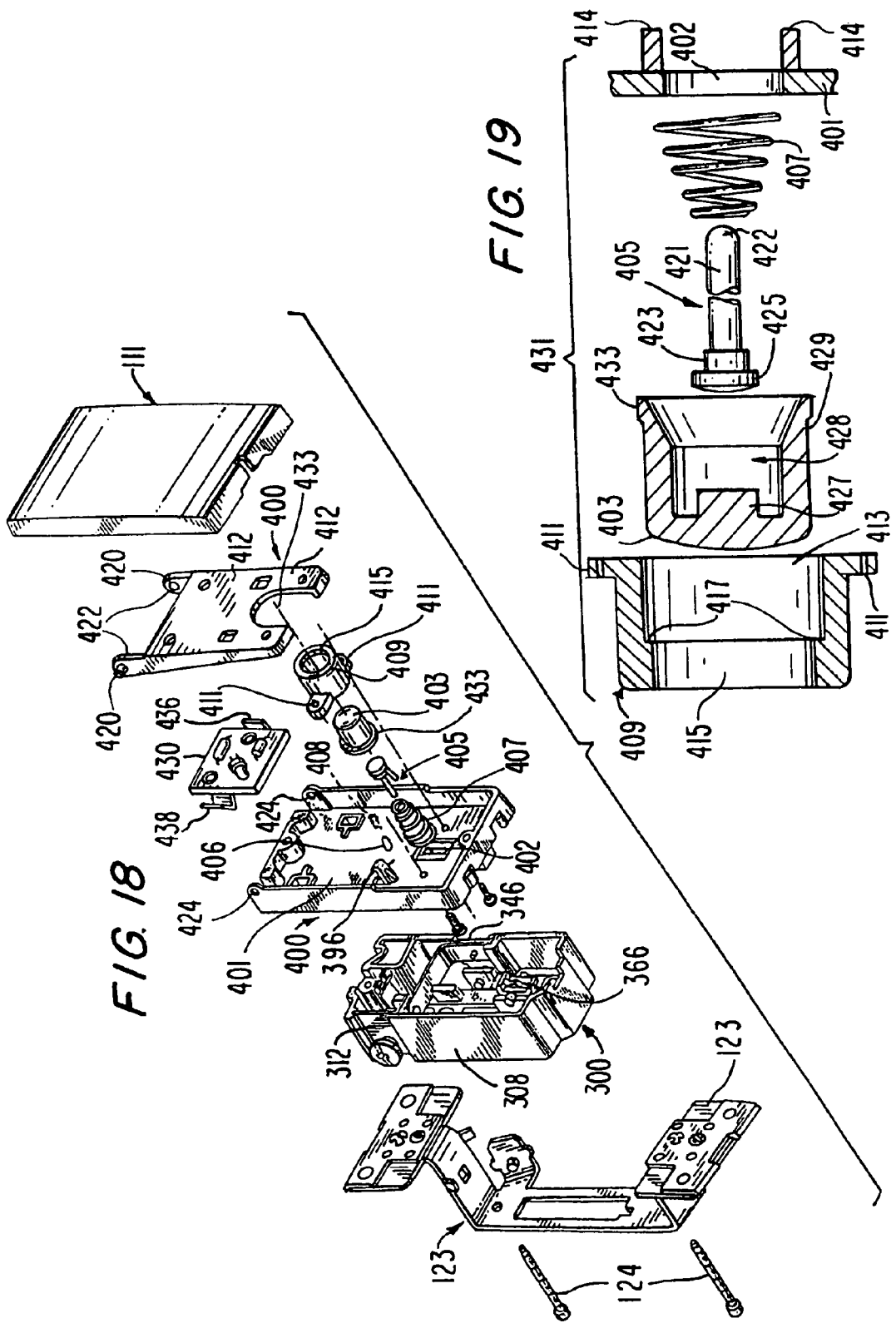

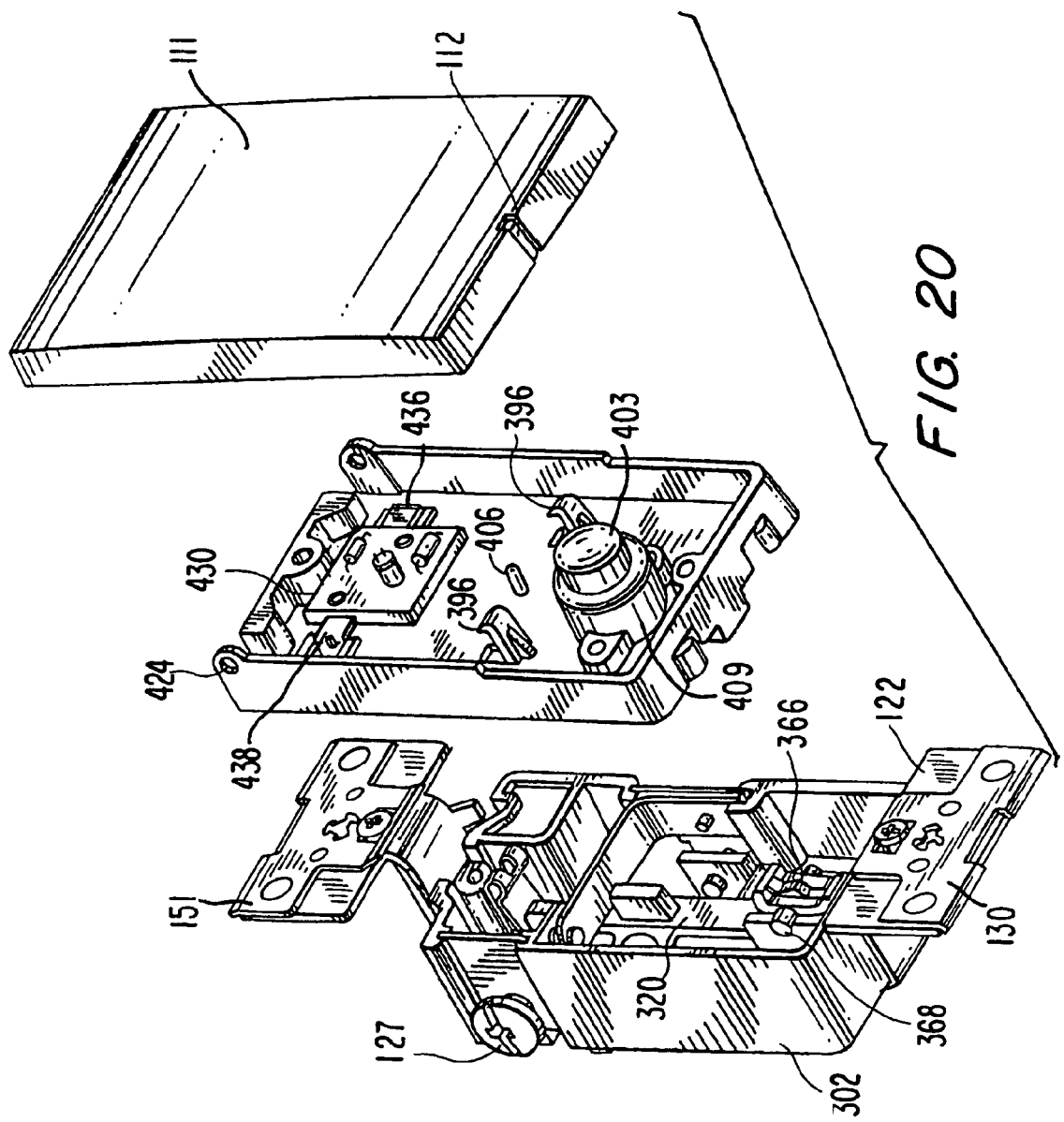

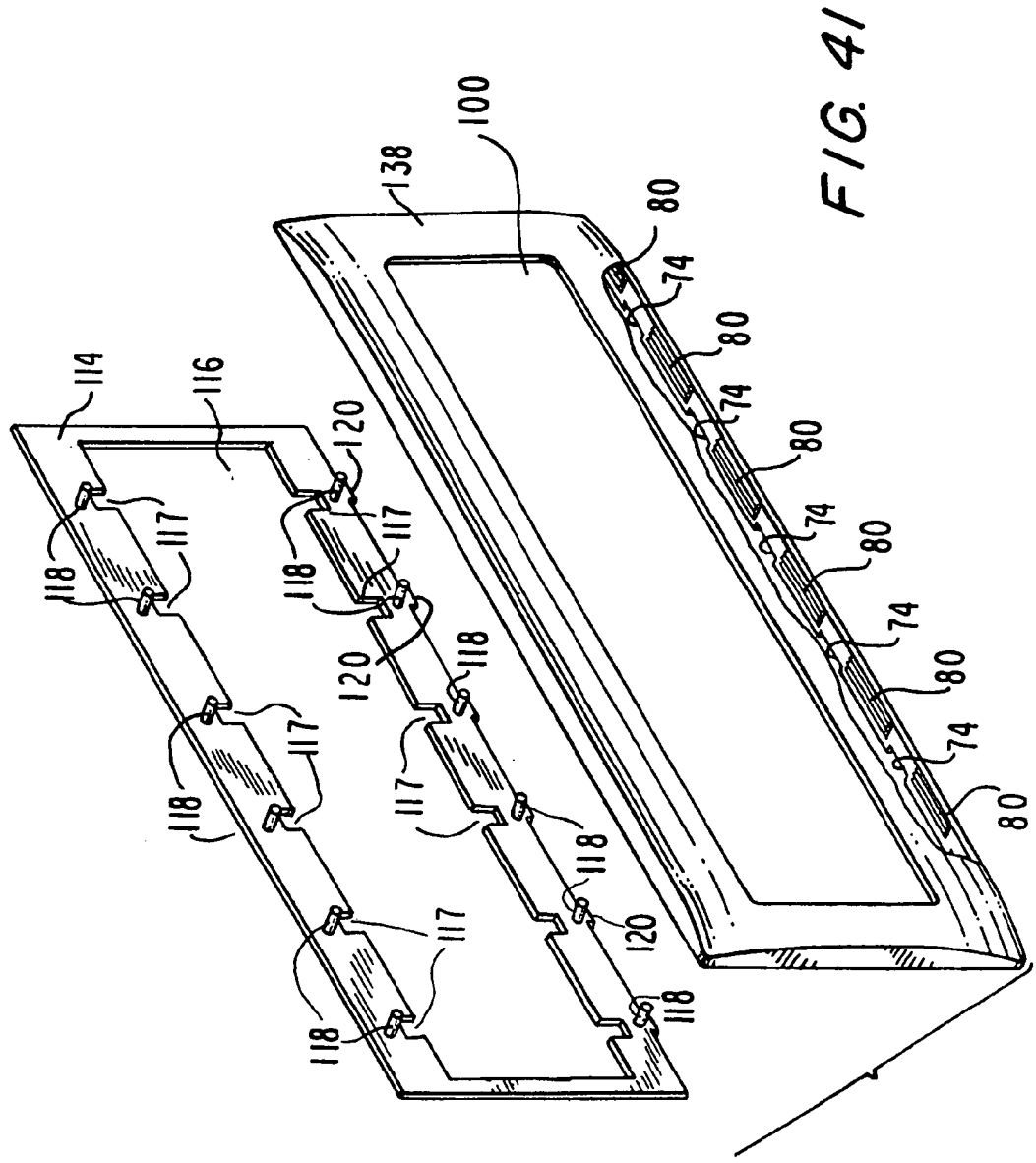

ROCKER PADDLE SWITCH WITH FLEXIBLE CAM DRIVER

This application is a continuation in part of application Ser. No. 10/627,224, filed Jul. 25, 2003.

BACKGROUND OF THE INVENTION

1. Field of the Invention

The present invention relates generally to the field of electrical wiring devices such as, by way of example only, electrical switches and receptacles of the type installed in building walls, and more specifically to a robust electrical wiring device system whose components may be modular and interchangeable and which provide a substantially unified blended appearance when combined with one another. The present patent specification describes such a robust system and, in whole or in part, is common in part to several patent applications whose claims vary and/or are directed to portions and/or components of the robust system.

2. Description of the Related Art

When modifying the wiring in an existing building, whether public, commercial or residential by adding a wiring device such as a switch, a receptacle or a combination of a receptacle and a switch, it is necessary to cut a hole in a wall of the building, install a box within the hole, attach the box to a vertical stud, for example, and install the wiring device(s) into the box. In new construction, the box is attached to a stud of an open wall and, thereafter, the wall, which may be sheet rock having an opening for access to the box, is placed over the studs. The conventional wall box has pairs of mounting ears for mounting the wiring devices to the box. After the wiring devices are connected to the various conductors they will service, each is fastened with threaded fasteners (sometimes referred to as bolts or screws, and these terms are used interchangeably herein) to a pair of ears on the box. The process of connecting a wiring device to various conductors and then attaching the wiring device with the attached wires to the box is done for each wiring device located within the box. Thereafter, a wall plate is typically positioned around or over each of the wiring devices in the box.

Typical installations can include a single wiring device or multiple wiring devices positioned side by side in a common box. In installations where there are multiple wiring devices in a common box, the installation of the wall plate can be time consuming. This is so because a wall plate for use with multiple wiring devices has a separate window opening for each wiring device. Thus, the wiring devices must be aligned with each other, must be positioned parallel to each other and must be spaced from each other by a distance that is dictated by the spacing between the openings or windows in the wall plate. Misalignment and positioning problems are often caused by wall boxes that are skewed relative to the wall or by walls which may not be flat. It is only after all of the wiring devices are accurately positioned relative to each other that a wall plate can be installed around the wiring devices.

A common type of electrical wiring device in use today is the rocker type Decora-branded electrical switch whose activating member pivots about a centrally located horizontal axis. The trademark Decora is owned by the assignee of the present invention. To operate, the rocker switch actuating member is pushed in at the top to supply electricity to a load such as a light, and is pushed in at the bottom to disconnect the source of electricity from the load. Thus, with two or more rocker type of switches positioned side by side in a box, the actuating members of the switches can be in opposite positions at any one time. For example, with two rocker type switches positioned side-by-side in a box, what will be called the top edge associated with the "on state or position" of the actuating member of one switch will be flush with the top surface of the wall plate when in its on position while, at the same time, the top edge of the adjacent switch will be flush with the bottom surface defining the opening of the wall plate when in its off position. This in-out positioning of adjacent switches can also occur when both switches are in their on or off state if one or each of the switches is a 3-way or 4-way switch. The irregular in-out positioning of adjacent switches, particularly with 3-way and 4-way switches, can create operational uncertainty in the mind of the user as to which switch is in the on position and which switch is in the off position when subsequent activation or deactivation of less than all of the rocker switches is required by a user.

Thus, what is needed is a rocker type of switch that is always in the same position i.e., bottom edge out, top edge in, regardless of its state of conduction, i.e., on or off. What is also needed is a switch which, when positioned side by side with another or other switches in a common box, that the switches are always aligned with each other regardless of whether they are in their on state or off state.

SUMMARY OF THE INVENTION

There is disclosed an on-off switch operated by pushing on the lower portion of a rocker paddle to turn the switch on or off. The lower edge of the rocker paddle pivots in and out about its upper edge. Spring bias means urges the lower portion of the rocker paddle to be in its out position when the switch is "on" or "off" position. The rocker paddle of the switch is not located within a frame and has, along its vertical axis, a surface of positive first differential and zero second differential, comprised of a combination of splines which extend between points of varying distances from a datum plane. The surface has zero second differential when the rate of height increase of individual splines is constant.

A flexible cam driver coupled to the rocker paddle of the switch causes a cam to rotate in a clockwise direction and in a counter clockwise direction each time the rocker paddle is depressed. Alternate rotation of the cam drives a slider member having a cam follower back and forth along a linear axis. A shaped leaf spring cooperates with the cam follower to assist in the movement of the slider and to determine its rest positions. An indicator such as an LED is used to indicate the state of conduction of the switch.

The foregoing has outlined, rather broadly, a preferred blending of features, for example, of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

FIG. 13 is a plan view of multi-function clip normally attached to the top end of the ground/mounting strap;

FIG. 13A is a sectional view of the multi-function clip along line A—A of FIG. 13;

FIG. 14 is an exploded view of a switch in accordance with the principles of the invention;

FIG. 17 is another exploded view of the switch;

FIG. 18 is still another exploded view of the switch;

FIG. 19 is a partial sectional exploded view of the cam driver of the switch;

FIG. 20 is a perspective exploded view of the switch showing the light assembly board;

FIG. 41 is an exploded view of alignment plate and wall plate for six wiring devices.

DESCRIPTION OF A PREFERRED EMBODIMENT

Figure 1:
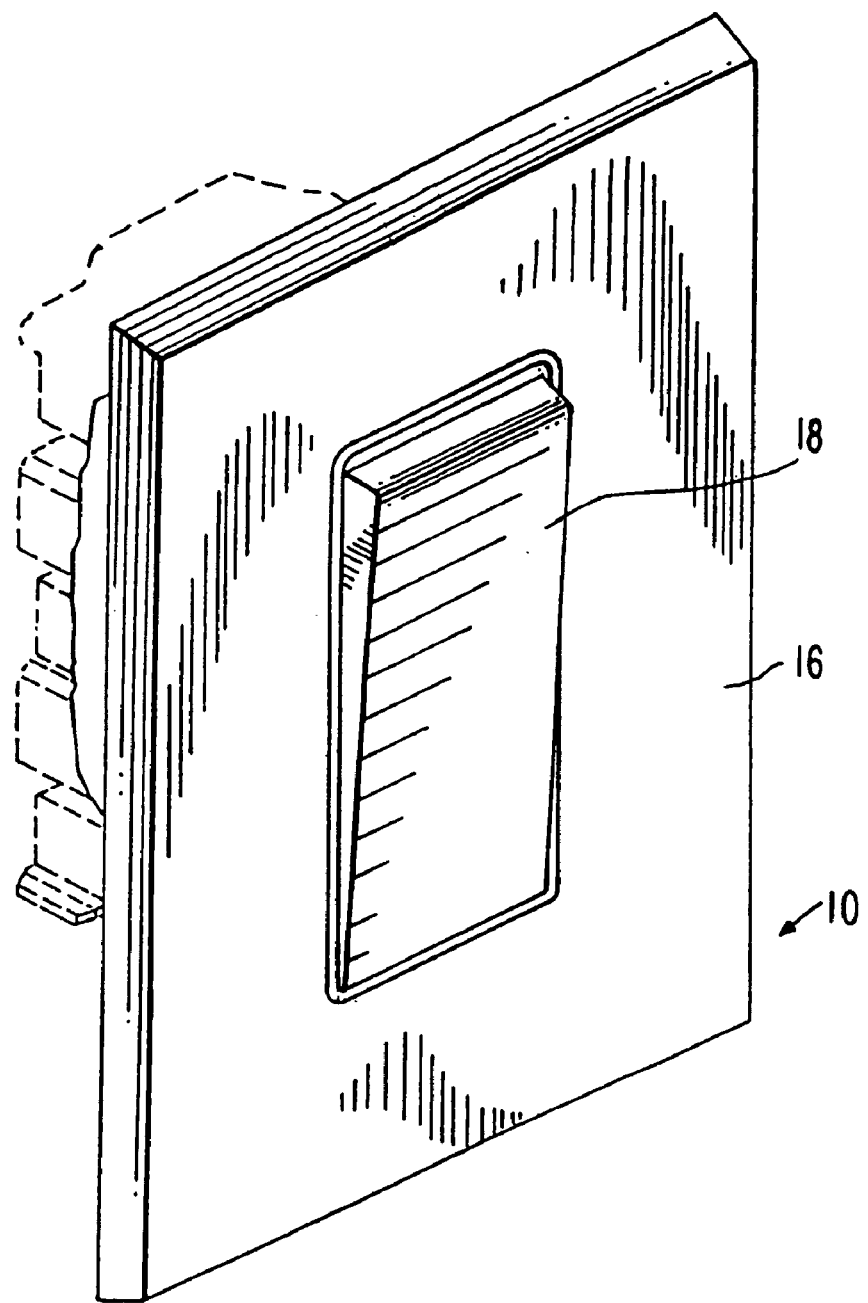
FIG. 1 is a front perspective view of a prior art switch and wall plate.
Figure 2:
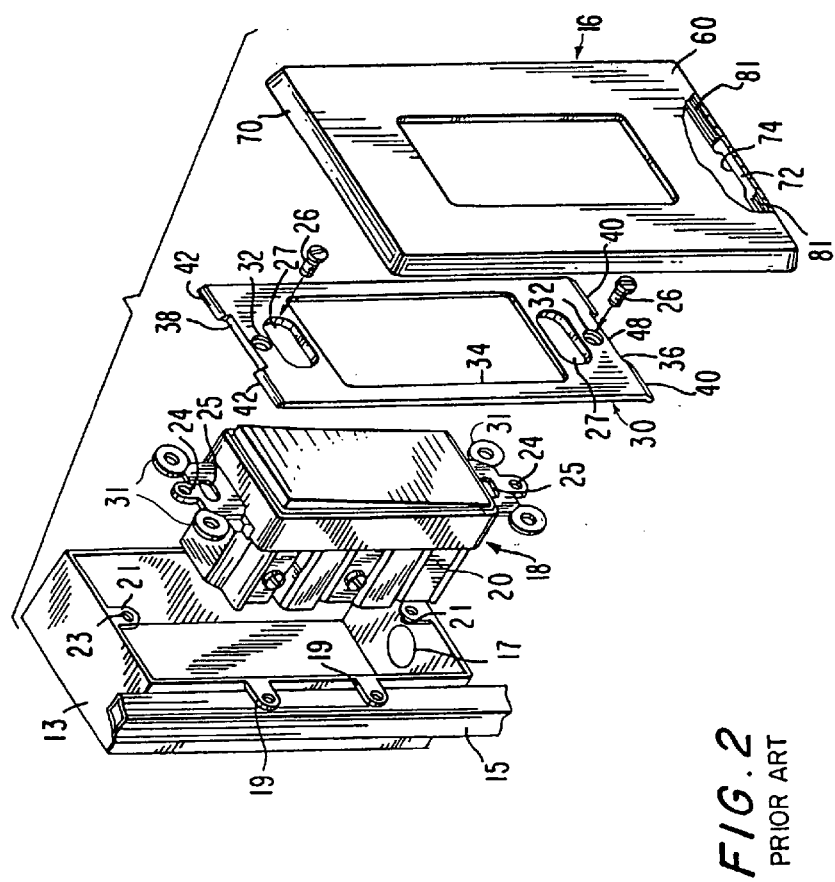
FIG. 2 is a perspective exploded view of a prior art switch, attachment plate and wall plate, and a box for receiving said prior art device.

Referring to FIG. 1, there is illustrated a front perspective view of a "Decora" type electrical wall-type switch 18 and wall plate 16, as part of an assembly 10 of the prior art. Referring to FIG. 2, there is shown a perspective exploded view of the prior art device of FIG. 1 of wall box 13, electrical wiring device such as switch 18, attachment plate 30 and wall plate 16. A suitable aperture is cut into a wall to provide access for the box 13 for mounting to a stud 15, or to permit installation of a suitable box to an adjacent stud or directly to the material of the wall (such as plasterboard). The box 13 is chosen to be large enough to accept as many wiring devices as are to be mounted therein. The box 13 is made of metal or plastic, depending upon local Code requirements, and has one or more openings in its sides or back to permit the introduction of electrical wiring or cables into the interior of the box 13. Box 13 has mounting means 19 to permit the box to be anchored to the adjacent stud 15. The box supports a pair of mounting ears 21 for each wiring device that is to be mounted within the box. Each mounting ear contains a threaded aperture 23 to which is fastened a mounting screw of the wiring device such as, for example, rocker switch 18 or a receptacle. In the normal order of assembly, electrical cables are passed through knock out openings 17, for example, to the interior of the box. The ends of the electrical cables are stripped of insulation and attached to terminals (contacts) on the side or rear of the body 20 of the switch 18 or a receptacle. After the electrical cables are attached to terminals on the side or rear of the body of the switch, the switch is pushed into the box and held in position by screws (not shown) that are passed through clearance openings such as elongated mounting slots 25 and threaded into openings 23 of ears 21 to mount switch 18 within and to the box 13. Thereafter, attachment plate 30 is positioned around the front of the switch and secured to the switch with mounting screws 26 which pass through clearance openings 32 in the attachment plate and are threaded into openings 24 formed in the mounting/ ground strap of the wiring device. Attachment plate 30 also contains a main aperture 34 of a shape complimentary with the profile of the front of the switch 18 which extends through it. Aperture 34 in FIG. 1 is rectangular to accept the front of the switch 18 or a receptacle. The head of the screw which passes through aperture 25 of switch 18 and engages threaded opening 23 of mounting ears 21 is larger than the aperture 25 and, therefore, holds switch 18 or a receptacle captive to the box 13 and to the wall surface (not shown). In a similar manner, the head of the screw which passes through aperture 32 of the attachment plate 30 and engages threaded opening 24 of the ground strap of the switch is larger than the aperture 32 and, therefore, holds attachment plate 30 captive to the switch 18.

At each of the ends 36, 38 respectively, of attachment plate 30 are two latching pawls 40, 42 which are formed as extensions of attachment plate 30 but are thinner in cross-section. One end 36 also terminates in an angled leg 48 which extends at about a 45 degree angle with respect to the horizontal edge of end 38 of wall plate 30 and is used to help release an attached wall plate.

Wall plate 16 is proportioned to fit over attachment plate 30 and box 13 into which the single wiring device, such as rocker switch 18, or a receptacle is placed and to which it is fastened.

To attach wall plate 16 to attachment plate 30, pawls 40, 42 of attachment plate 30 are made to engage saw-tooth shaped racks 81 on the inner surfaces of end walls 70 and 72 of wall plate 16 as the wall plate is pushed in.

Figure 3:
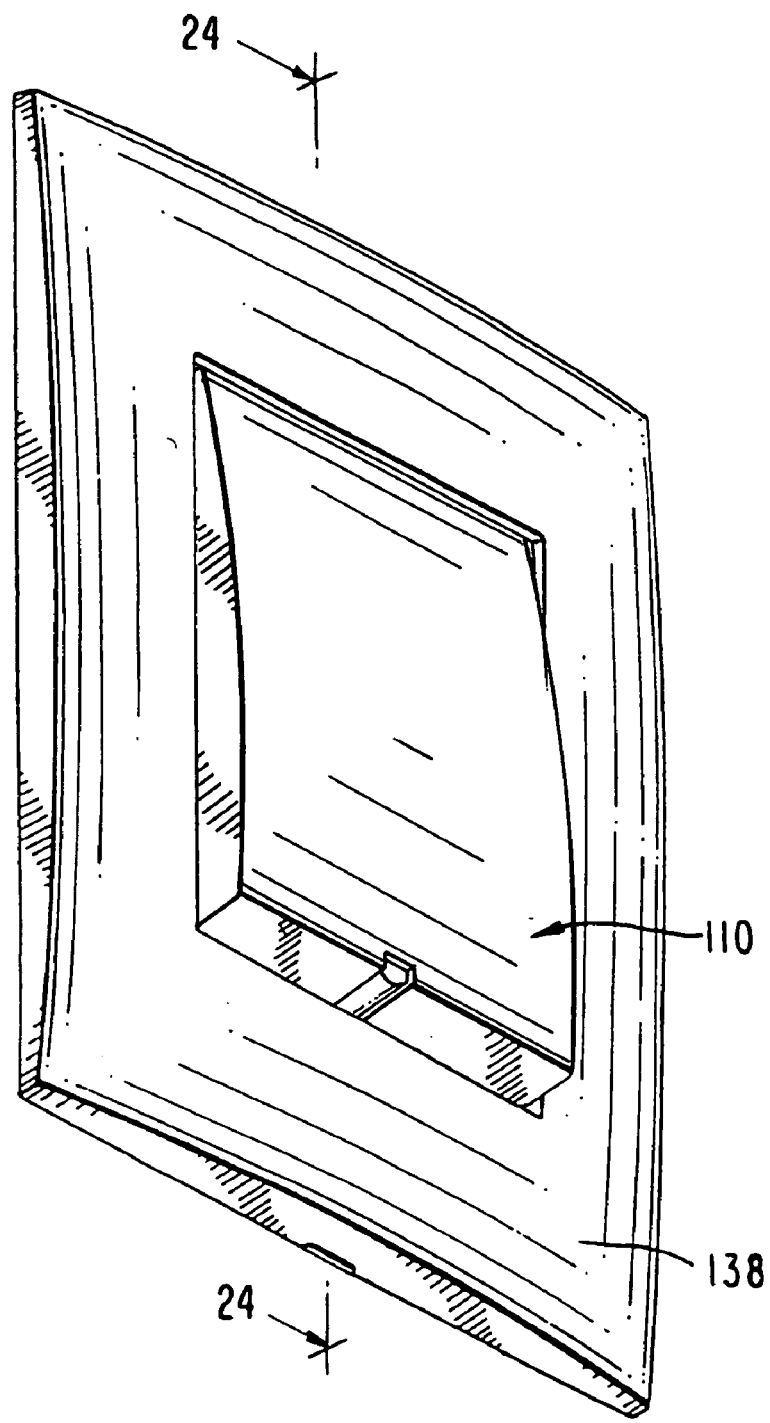
FIG. 3 is a front perspective view of a switch and wall plate in accordance with the principles of the invention.
Figure 4:
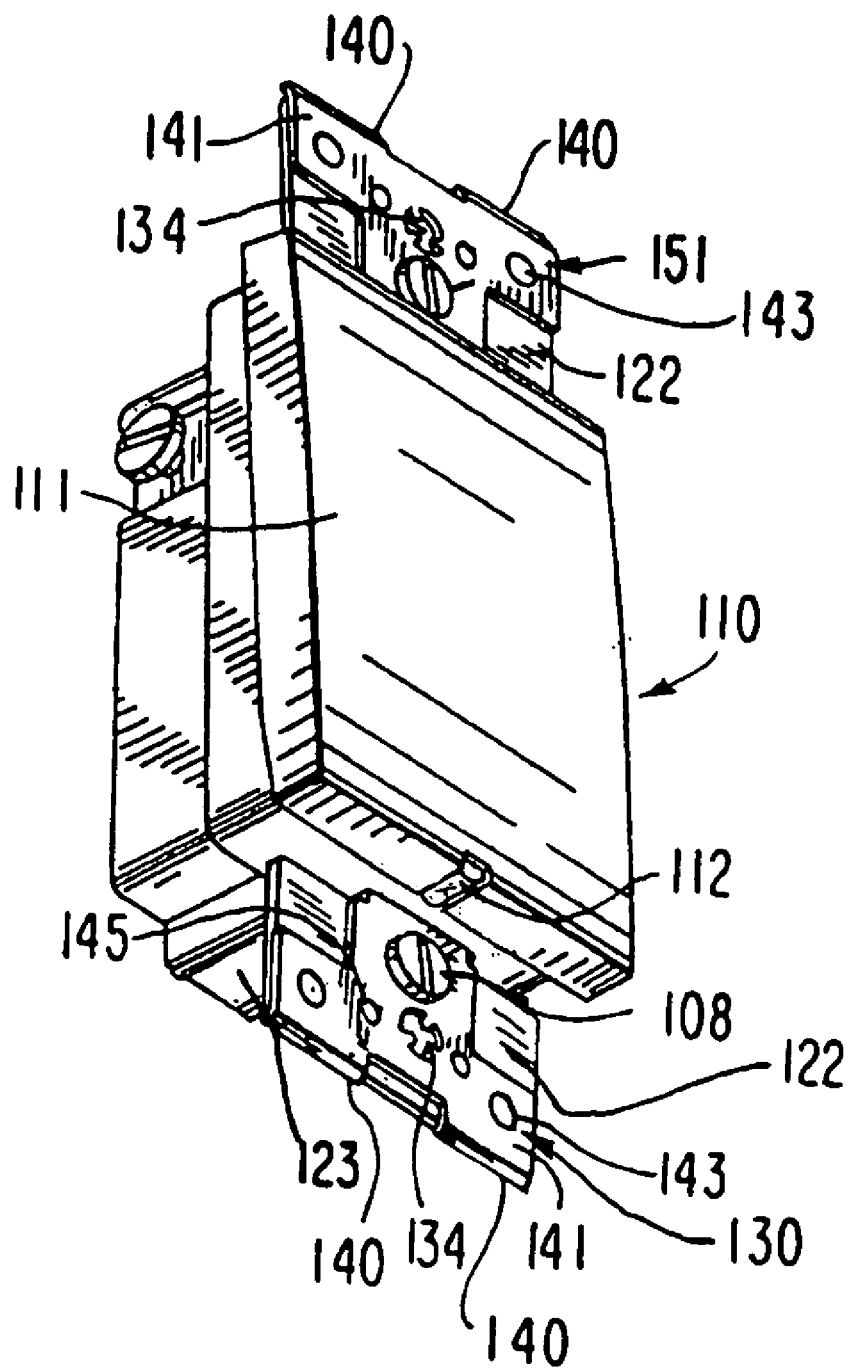
FIG. 4 is a front perspective view of the switch shown in FIG. 3 showing the ground/mounting strap and multi-function clips.
Figure 5:
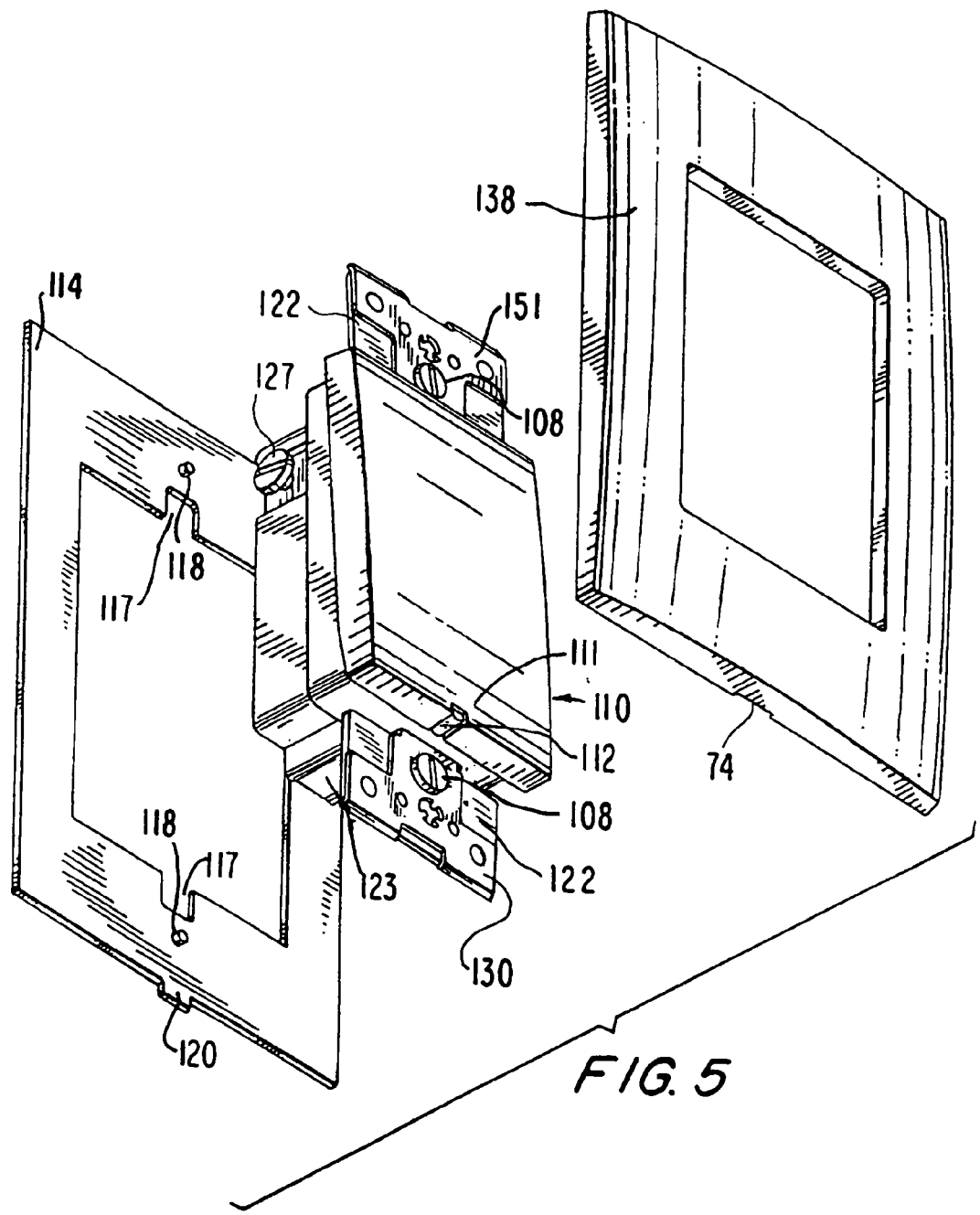
FIG. 5 is an exploded view of attachment plate, switch and wall plate according to the principles of the invention.

FIG. 3 is a front perspective view of a wiring device such as switch 110 and wall plate 138 in accordance with the principles of the present invention; FIG. 4 is a front perspective view of the switch 110 of FIG. 3 showing ground/mounting strap and multi-function clips; and FIG. 5 is an exploded view of FIG. 3 showing attachment plate, switch and wall plate. Referring to FIGS. 4 and 5, the switch 110 has an actuating paddle 111 which pivots about an axis at its upper end and is biased by an internally located spring member to assume the same at-rest position when in its "on" and "off" position. Repeated pressing and releasing on the face of the paddle 111 of the switch alternately closes and opens a set of contacts within the switch body to alternately connect and disconnect a load such as a light with a source of electricity each time the paddle is pressed and released. Thus, regardless of whether ganged switches are on-off switches, 3-way switches or 4-way switches, the top and bottom edges of each switch will always be aligned with the top and bottom edges of all the other switches of the gang. An on-off indicator such as a light 112 is provided in the paddle to indicate to a user when the switch is in its on position or off position. For example, when the light 112 is on, the switch will be in its off position, and when the light is off, the switch will be in its on position. The paddle 111 of the switch is not located within a frame and functionally complements the wall plate 138. The paddle of the switch has a length-width ratio dimension and surface configuration which provides a contact surface of increased size which is more easy to identify and use.

The switch 110 is attached to a ground/mounting strap 123 having ends 122 which provide increased surface area for contact with the surface of a wall and provides support for multi-function clips 130, 151 attached to the ends 122 by fastener means such as screws, rivets, spot welds, pressure bonding, TOX process or the like.

Figure 10:
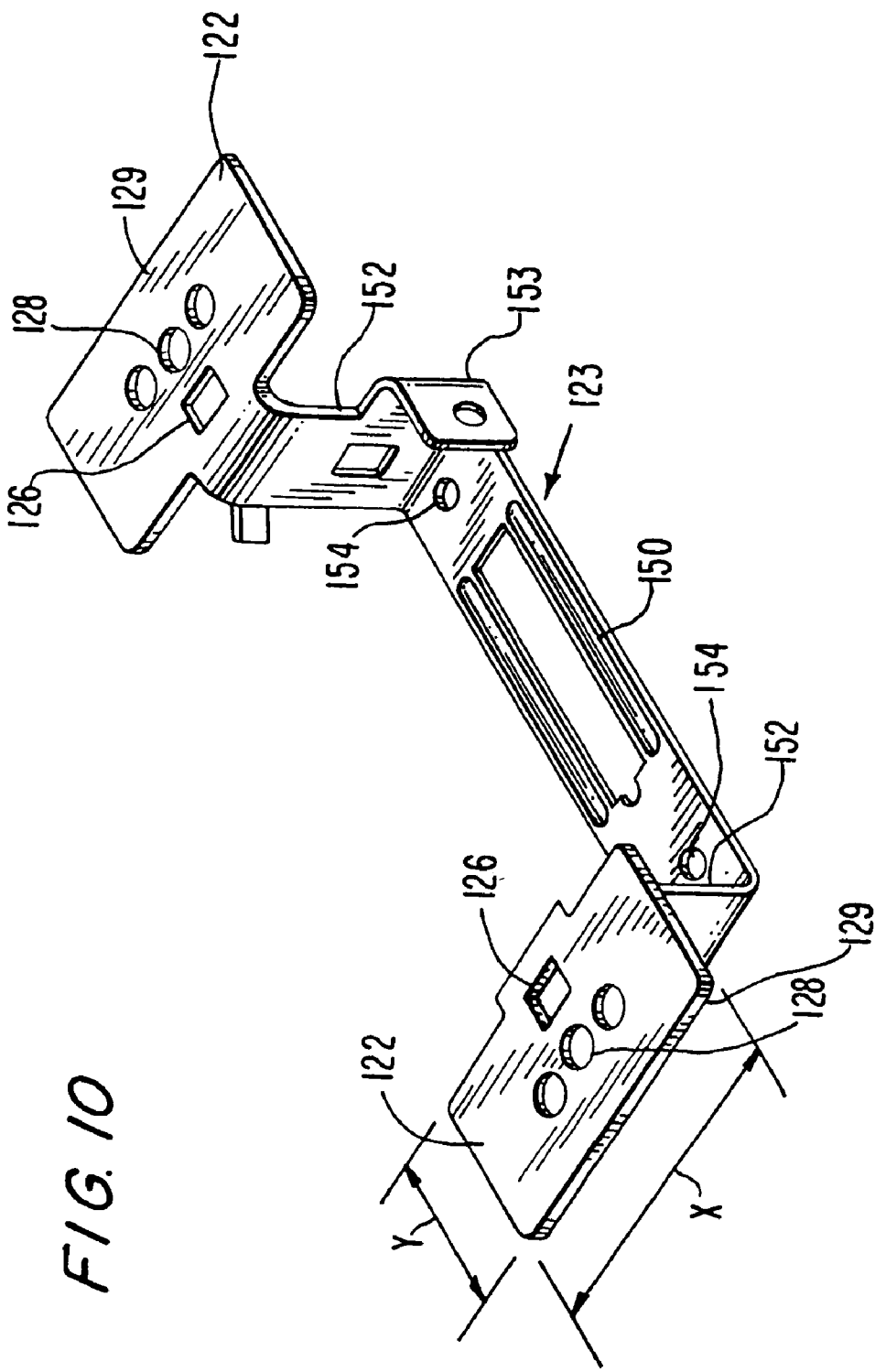
FIG. 10 is a perspective view of ground/mounting strap for a wiring device.
Figure 11:
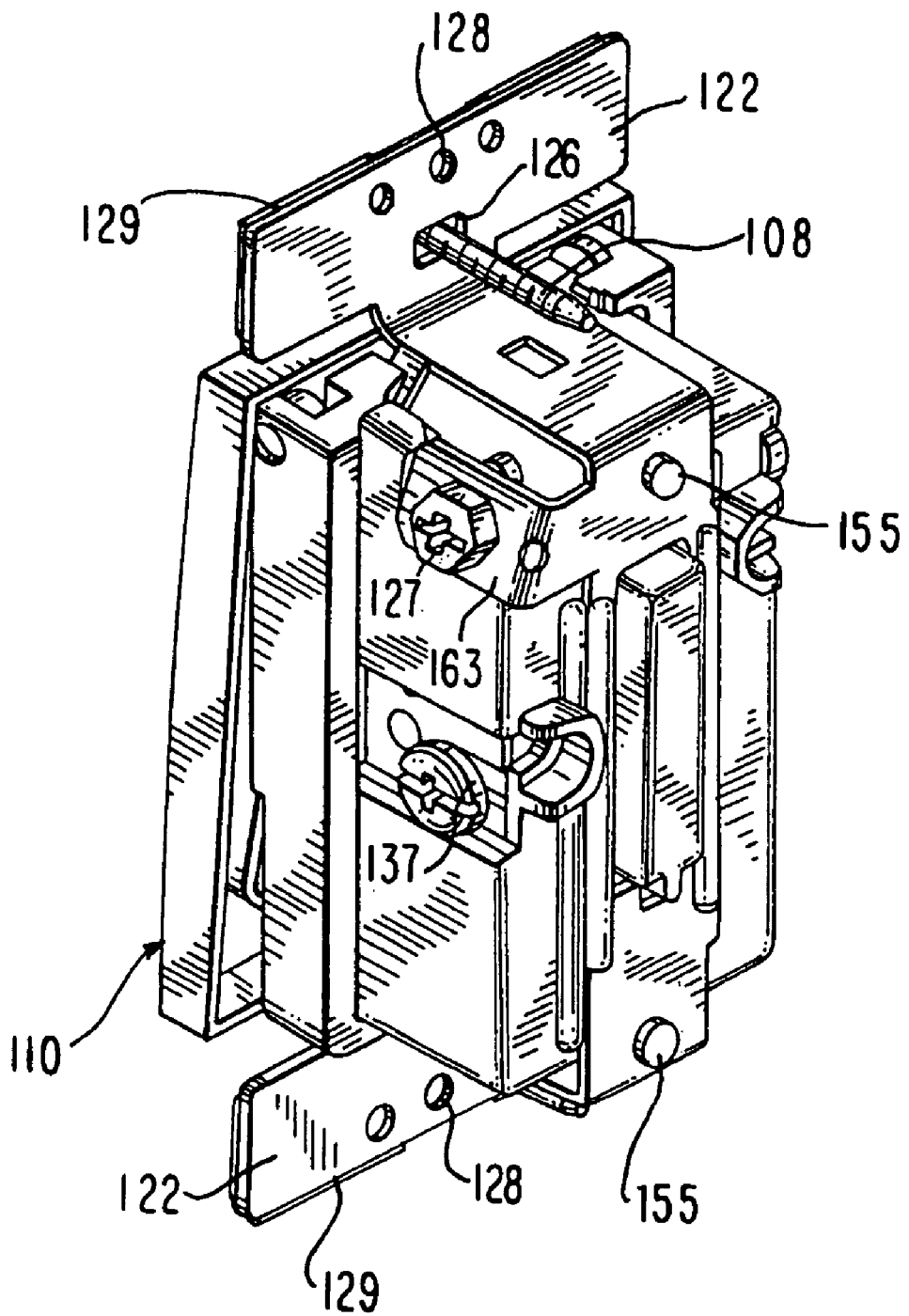
FIG. 11 is a bottom perspective view showing ground/mounting strap attached to a switch.

Referring to FIG. 10, there is shown a perspective view of the ground/mounting strap 123 for a wiring device such as switch 110. Strap 123 has a base support member 150 located between two intermediate support members 152 bent at right angles to the base member 150 and which terminate with an outward projecting end 122. The two intermediate support members 152 and the base support member cradles and are securely attached to the wiring device, such as switch 110, with rivets, screws or the like 155 (see FIG. 11 which is a bottom perspective view showing ground/mounting strap attached to a switch) which pass through openings 154 in the base support member. A ground terminal 163 which projects out from the ground/mounting strap and having a threaded opening for receiving a screw 125 is provided for connection to a ground wire. Each end 122 of the strap 123 is rectangular in shape and has two openings 126 and 128. Opening 126 can be circular, oval, square or rectangular and is a clearance opening for mounting screws 108 which can be provided by the manufacturer of the wiring device for attaching the wiring device to a box. The distance between centers of openings 126 in ends 122 of the ground/mounting strap is equal to the distance between the centers of openings 23 in ears 21 of box 13 (see FIG. 2) to allow mounting screws 108 to engage and be held captive by threaded openings 23. Opening 128 in each end 122 of the strap is a clearance opening for an alignment pin which is a part of and is located on an alignment plate. Additional openings can be provided in the ends 122 for attaching and/or aligning a clip to the end of the ground/mounting strap. The ends 122 are flat rectangular members which provide an increased area for increased contact with a wall surface. See FIG. 2 which shows the relatively small ends of a prior art ground/mounting strap where, if the scored washers 31 are removed from the strap, the only surface left for contact with a wall surface is the material around the opening of the mounting ear 21.

The end 122 of ground/mounting strap 122 has a width "X" of about 1.563 inches and a depth "Y" of about 0.318 inches. These dimensions are not critical. However, the distance between the edges 129 of the ends 122 of the strap should not be greater than 4.6 inches to allow a wall plate to fit over and cover the ground/mounting strap. The ground/mounting strap 123 can be of sheet metal and is secured to the switch with screws, rivets or any convenient fastening means 155. Screw terminals 126 located on either side of the body of the switch are provided to receive phase and neutral wire conductors, not shown.

Figure 12A:
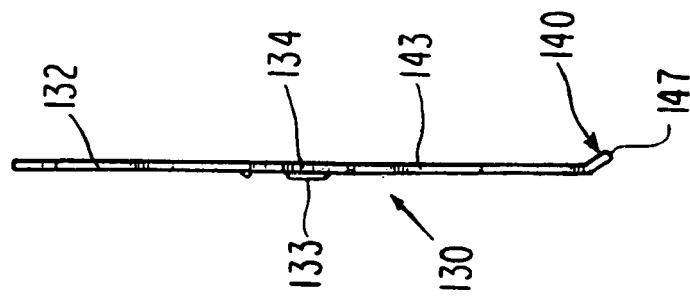
FIG. 12A is a side view of the multi-function clip of FIG. 12.
Figure 12:
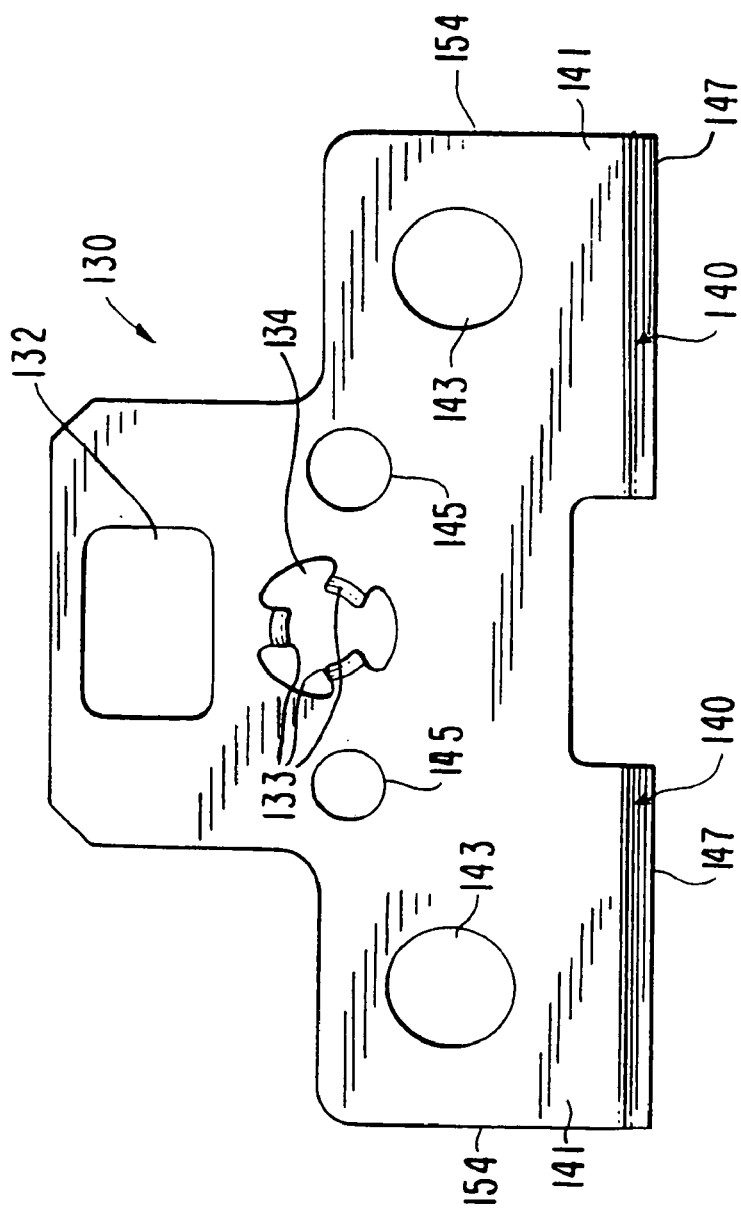
FIG. 12 is a plan view of multi-function clip normally attached to the bottom end of the ground/mounting strap.

Multi-function clips 130, 151 are attached to the ends 122 of the ground/mounting strap. The multi-function clips can be composed of phosphor bronze, spring brass, spring steel or the like. Referring to FIG. 12, there is shown a plan view of multi-function clip 130 normally attached to the bottom end of the ground/mounting strap, and FIG. 12A is a side view of the multi-function clip 130 of FIG. 12. Clip 130 is the clip that is attached to the bottom end 122 of ground/mounting strap 123 and has openings 132 and 134. When clip 130 is attached to the end of ground/mounting strap, opening 132 is aligned with opening 126 of the ground/mounting strap, and opening 134 is aligned with opening 128 in the strap end 122. Opening 132 is a clearance opening for a threaded fastener such as screw 108 used to couple the wiring device to a box. Opening 132 can be round, square, oval or rectangular to allow the threaded fastener to be moved up, down and sideways so the fastener can be aligned with the threaded opening in the box when connecting the wiring device to the box.

Opening 134 in clip 130 is substantially circular and has three inwardly projecting members 133 bent upward at an angle of between 10 degrees and 30 degrees toward the face of the wiring device. An angle of 20 degrees was found to be preferred. The ends of the three projecting members 133 form an opening slightly smaller than the outer diameter of an alignment pin 118 on an alignment plate (see FIG. 9) and flex or bend upward as the alignment pin enters the opening 134 from the rear. The ends of the projecting members 133 frictionally engage and hold captive the alignment pin to inhibit its easy removal from the multi function clip. Located at the end 147 of clip 130 are latching pawls 140 each slightly more than one-half of an inch in length. The end 149 of each latching pawl 140 is bent upward at an angle of between 20 degrees and 60 degrees and is used to engage tooth shaped racks on the inside surface of the ends of a wall plate to hold the wall plate captive (see FIG. 35). The ends 149 of the latching pawls 140 capture and securely hold the wall plate when the upward bend of the latching pawl 140 is between 20 degrees and 60 degrees, where a bend of about 40 degrees was found to be preferable. The multi-function clip 130 is just that, a clip which performs a plurality of functions not disclosed in the prior art.

The opening 143 in the multi-function clips can be provided for attaching the clip to the end of the ground/mounting strap with, for example, rivets, screws, the TOX process etc. Openings 145 can be provided for alignment purposes when attaching the clip to the end of the strap. The distance between the side edges 154 of the clip should not exceed 1.533 inches to allow the clip to be attached to the end of the mounting/ground strap without extending over the side edges of the strap 123. The clip shown in FIGS. 12 and 12A is the clip that is attached to the bottom end of the ground/mounting strap.

Referring to FIG. 13, there is shown a plan view of the multi-function clip normally attached to the top end of the ground/mounting strap and FIG. 13A is a sectional side view of the multi-function clip along line AA of FIG. 13. The clip shown in FIGS. 13 and 13A is similar to the clip shown in FIGS. 12 and 12A except that end 157 of clip 151 is bent upward and opening 153 for the threaded fastener has a tab 155 which extends into opening 153, and is bent at a slight downward angle toward the back of the switch. Tab 155 is provided to engage and hold captive the threaded body of fastener 108 and, in addition, helps to provide a ground connection between the strap and the threaded fastener to insure that the switch is connected to ground. As with clip 130, openings 153 in clip 151 and opening 126 in the strap are aligned with each other during assembly to permit the fastening means to be aligned with the threaded opening in the box as the switch is being attached to the box. The distance between the edges 147 of the clips should not exceed 1.533 inches to allow the clip to be attached to the end of the ground/mounting strap without extending over the side edges of the ends 122 of the strap 123.

Figure 6:
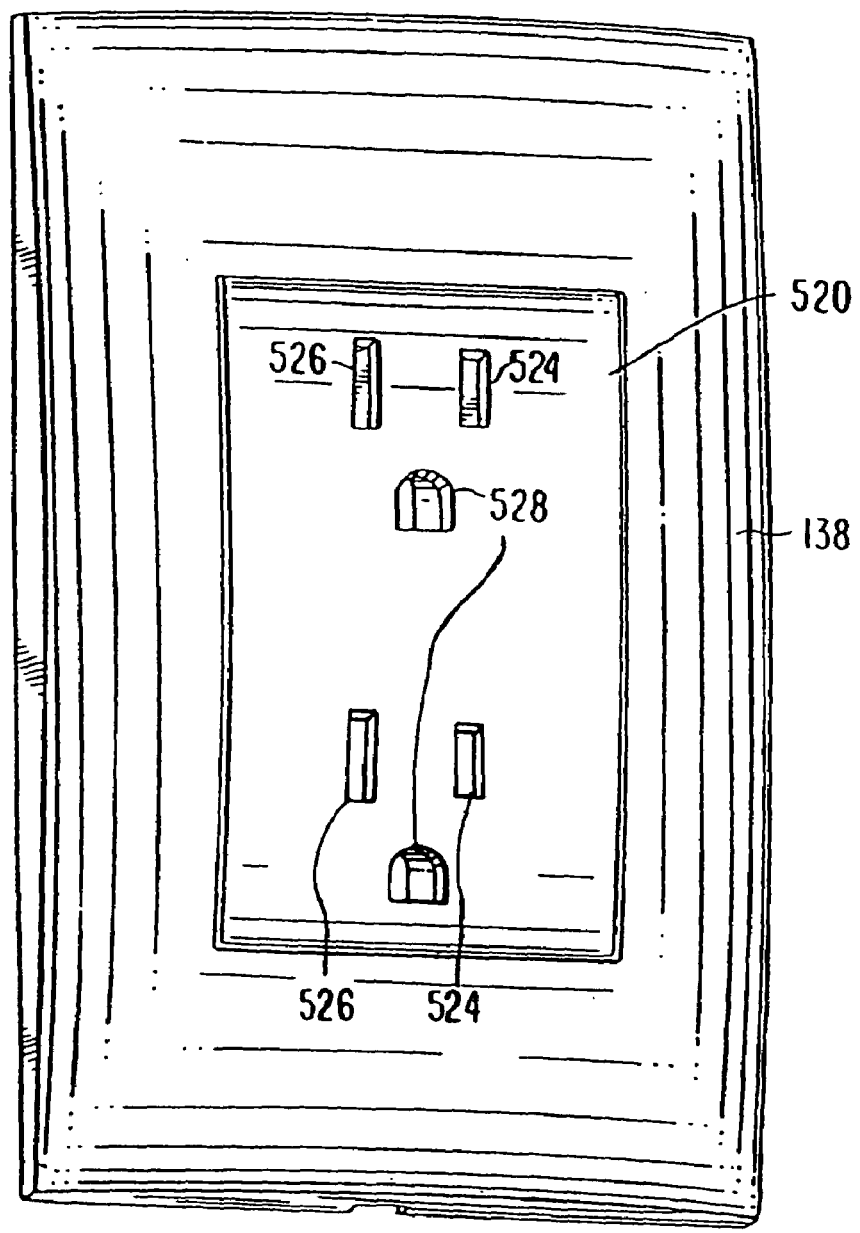
FIG. 6 is a front view of a receptacle and wall plate according to the principles of the invention.
Figure 7:
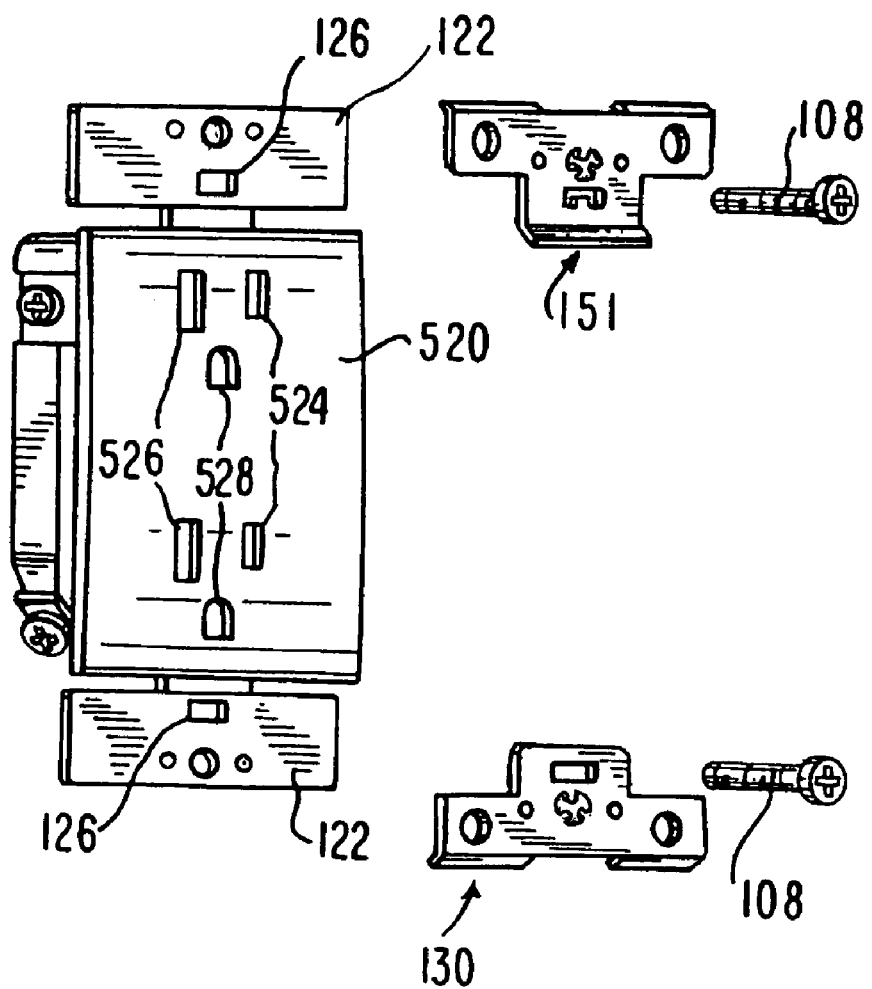
FIG. 7 is a front perspective view of a receptacle shown in FIG. 6 showing the ground/mounting strap and multi-function clips.
Figure 8:
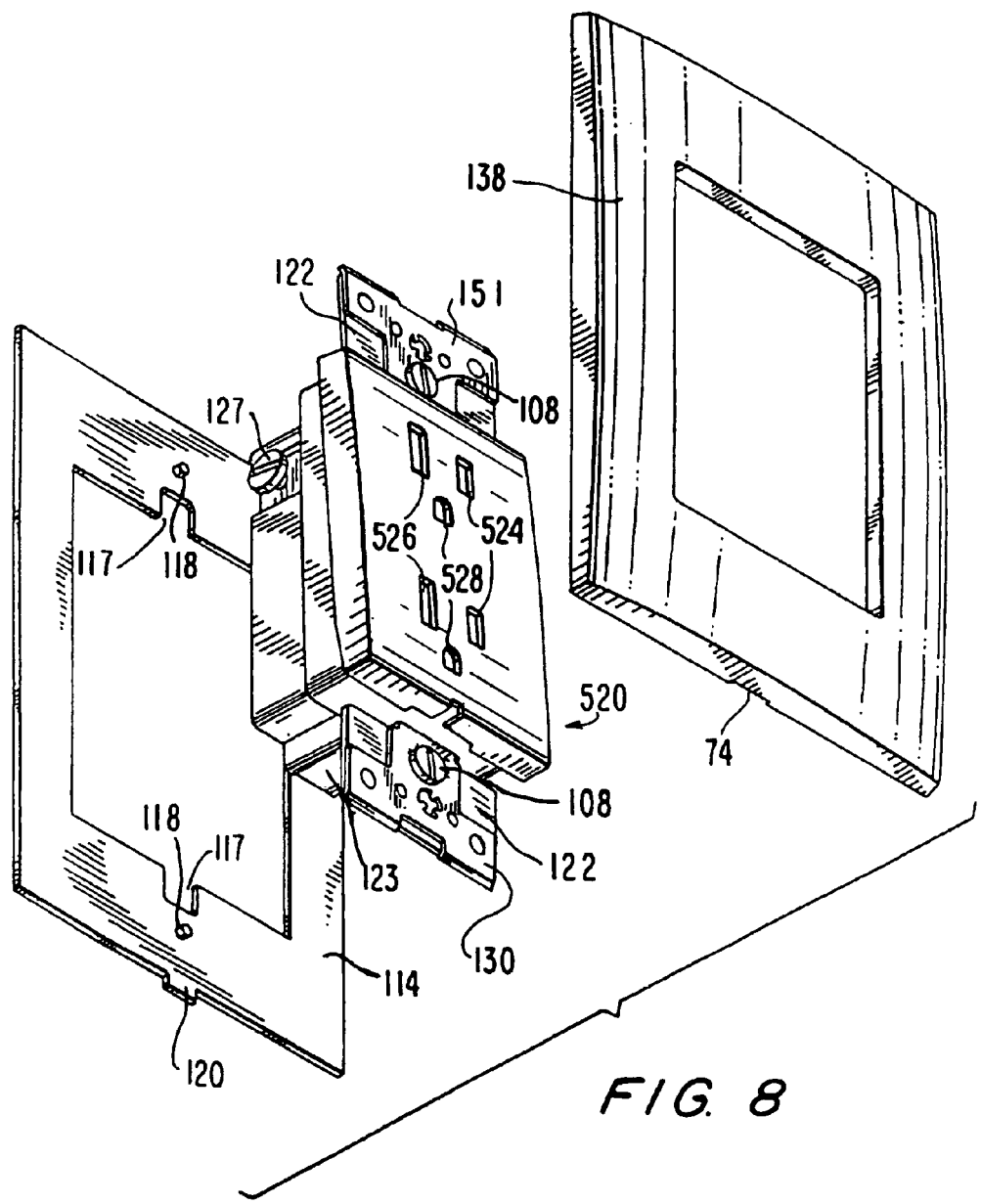
FIG. 8 is an exploded view of the attachment plate, receptacle and wall plate according to the principles of the invention.

Referring to FIG. 6, there is shown a front view of a receptacle and wall plate according to the principles of the invention; FIG. 7 is a front perspective view of the receptacle 520 of FIG. 7 showing ground/mounting strap and multi-function clips; and FIG. 8 is an exploded view of FIG. 6 showing attachment plate, receptacle plate, receptacle and wall plate. Referring to FIGS. 7 and 8, the receptacle 520 is intended for 15 Amp. 125 VAC to 20 Amp. 125 VAC (not illustrated) where, according to NEMA specification 5-15R, each individual receptacle has two slot openings 524 and 526 for receiving the flat blades of a suitable plug and a semi-circular ground blade opening 528. Opening 526 is larger than the opening 524 to allow a two blade plug to be inserted in only one way to maintain correct electrical polarization. The contact in the larger slot is connected to the neutral conductor and, by maintaining the correct polarization, the external metal parts of appliances such as toasters, TV's etc. can be grounded through the neutral conductor. The semi-circular ground blade prevents a plug from making a reverse polarity connection with the receptacle.

Receptacle 520 is attached to a ground/mounting strap 123 having ends 122 which provide increased surface area for contact with the surface of a wall and provides support for multi-function clips 130, 151 attached to the ends 122 by fastening mean such as screws, rivets, spot welds, pressure bonding, TOX process or the like.

Referring to FIG. 10, there is shown a perspective view of the ground/mounting strap 123 for a wiring device such as receptacle 520. Strap 123 has a base support member 150 located between two intermediate support members 152 bent at right angles to the base member 150 and which terminates with an outward projecting end 122. The two intermediate support members 152 and the base support member cradles and are securely attached to the receptacle 520 with rivets, screws or the like (see FIG. 11) which is a bottom perspective view showing ground/mounting strap attached to a receptacle) which pass through openings 154 in the base support member. A ground terminal 163 which projects out from the ground/mounting strap and having a threaded opening for receiving a screw 125 is provided for connection to a ground wire. Each end 122 of the strap 123 is rectangular in shape and has two openings 126 and 128. Opening 126 can be circular, oval, square or rectangular and is a clearance opening for mounting screws 108 which can be provided by the manufacturer of the wiring device for attaching the wiring device to a box. The distance between centers of openings 126 in ends 122 of the ground/mounting strap is equal to the distance between the centers of openings 23 in ears 21 of box 13 (see FIG. 2) to allow mounting screws 108 to engage and be held captive by threaded openings 23. Openings 128 in each end 122 of the strap is a clearance opening for an alignment pin which is a part of and is located on an alignment plate. Additional openings can be provided in the ends 122 for attaching and/or aligning a clip to the end of the ground/mounting strap. The ends 122 are flat rectangular members which provide an increased area for increased contact with a wall surface. See FIG. 2 which shows the relatively small ends of a prior art ground/mounting strap where, if the scored washers 31 are removed from the strap, the only surface left for contact with a wall surface is the material around the opening of the mounting ear 21. The end 122 of ground/mounting strap 122 has a width "X" of about 1.563 inches and a depth "Y" of about 0.318 inches. These dimensions are not critical. However, the distance between the edges 129 of the ends 122 of the strap should not be greater than 4.6 inches to allow a wall plate to fit over and cover the ground/mounting strap. The ground/mounting strap 123 can be of sheet metal and is secured to the receptacle with screws, rivets or any convenient fastening means 155. Screw terminals 126 located on either side of the body of the receptacle are provided to receive phase and neutral wire conductors, not shown.

Multi-function clips 130, 151 are attached to the ends 122 of the ground/mounting strap. The multi-function clips can be composed of phosphor bronze, spring brass, spring steel or the like. Referring to FIG. 12, there is shown a plan view of multi-function clip 130 normally attached to the bottom end of the ground/mounting strap, and FIG. 12A is a side view of the multi-function clip 130 of FIG. 12. Clip 130 is the clip that is attached to the bottom end 122 of ground/mounting strap 123 and has openings 132 and 134. When clip 130 is attached to the end of the ground/mounting strap, opening 132 is aligned with opening 126 of the ground/ mounting strap, and opening 134 is aligned with opening 128 in the strap end 122. Opening 132 is a clearance opening for a threaded fastener such as screw 108 used to couple the wiring device to a box. Opening 132 can be round, square, oval or rectangular to allow the threaded fastener to be moved up, down and sideways so the fastener can be aligned with the threaded opening in the box when connecting the wiring device to the box.

Opening 134 in clip 130 is substantially circular and has three inwardly projecting members 133 bent upward at an angle of between 10 degrees and 30 degrees toward the face of the wiring device. An angle of 20 degrees was found to be preferred. The ends of the three projecting members 133 form an opening slightly smaller than the outer diameter of an alignment pin 118 on an alignment plate (see FIG. 9) and flex or bend upward as the alignment pin enters the opening 134 from the rear. The ends of the projecting members 133 frictionally engage and hold captive the alignment pin to inhibit its easy removal from the multi function clip. Located at the end 147 of clip 130 are latching pawls 140 each slightly more than one-half of an inch in length. The end 149 of each latching pawl 140 is bent upward at an angle of between 20 degrees and 60 degrees and is used to engage tooth shaped racks on the inside surface of the ends of a wall plate to hold the wall plate captive (see FIG. 35). The ends 149 of the latching pawls 140 capture and securely hold the wall plate when the upward bend of the latching pawl 140 is between 20 degrees and 60 degrees, where a bend of about 40 degrees was found to be preferable. Multi-function clip 130 is just that, a clip which performs a plurality of functions not disclosed in the prior art.

The opening 143 in the multi-function clips can be provided for attaching the clip to the end of the ground/mounting strap with, for example, rivets, screws, the TOX process etc. Openings 145 can be provided for alignment purposes when attaching the clip to the end of the strap. The distance between the side edges 154 of the clip should not exceed 1.533 inches to allow the clip to be attached to the end of the mounting/ground strap without extending over the side edges of the strap 123. The clip shown in FIGS. 12 and 12A is the clip that is attached to the bottom end of the ground/mounting strap.

Referring to FIG. 13, there is shown a plan view of multi-function clip normally attached to the top end of the ground/mounting strap and FIG. 13A is a sectional side view of the multi-function clip along line A—A of FIG. 13. The clip of FIGS. 13, 13A is attached to the top of the ground/mounting strap. The clip shown in FIGS. 13 and 13A is similar to the clip shown in FIGS. 12 and 12A except that end 157 of the clip 151 is bent upward and opening 153 for the threaded fastener has a tab 155 which extends into opening 153 and is bent at a slight downward angle toward the back of the receptacle. Tab 155 is provided to engage and hold captive the threaded body of fastener 108 and, in addition, helps to provide a ground connection between the strap and the threaded fastener to insure that the receptacle is connected to ground. As with clip 130, openings 153 in clip 151 and opening 126 in the strap are aligned with each other during assembly to permit the fastening means to be aligned with the threaded opening in the box as the receptacle is being attached to the box. The distance between the edges 147 of the clips should not exceed 1.522 inches to allow the clip to be attached to the end of the ground/mounting strap without extending over the side edges of the ends 122 of the strap 123.

Figure 9:
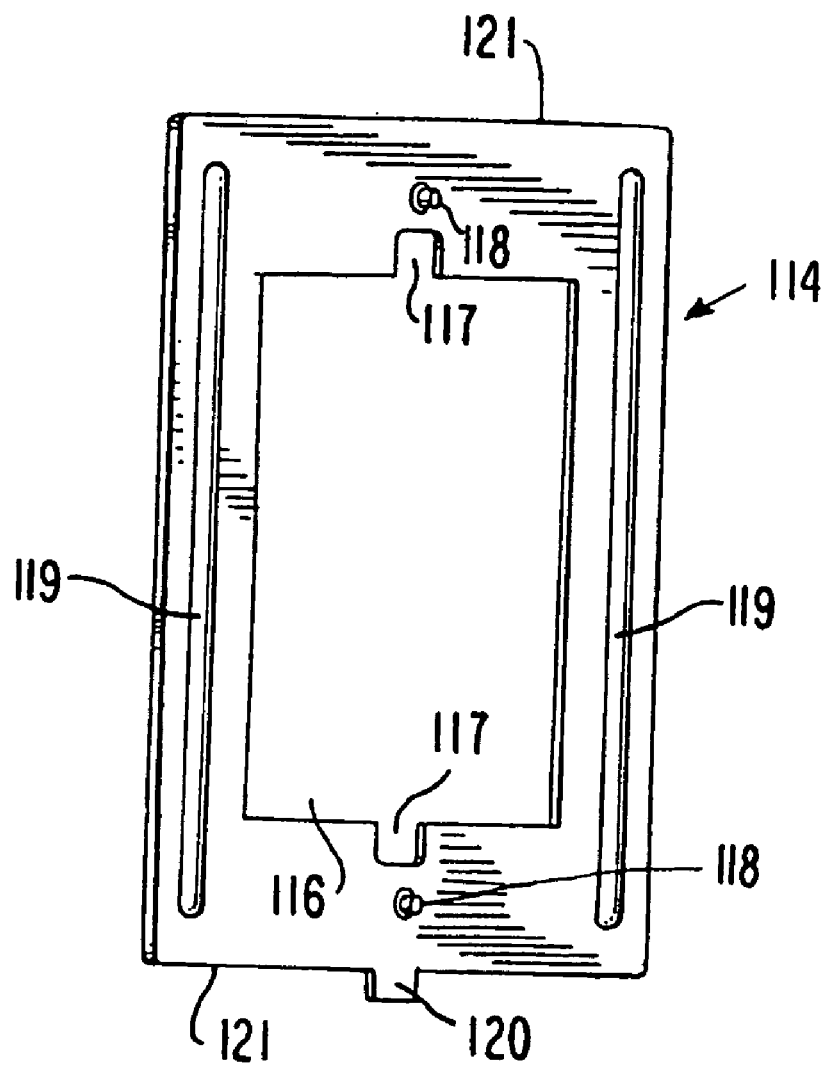
FIG. 9 is a front perspective view of alignment plate for a single wiring device.

Referring to FIG. 9, there is shown a front perspective view of alignment plate 114 of FIG. 5 for a single wiring device such as a switch or a receptacle. Alignment plate 114, which can be composed of any suitable material such as brass, aluminum, cold rolled steel, plastic, a plastic coated with a conducting material, etc., has a centrally located opening 116 sized to accept the body of a wiring device. Centrally located at opposite top and bottom ends of opening 116 and either opening into or separated from opening 116 are two clearance openings 117 for mounting screws 108 used to secure the wiring device, a switch or a receptacle, and alignment plate 114 to box 13. Located between the outer edge of each clearance opening 117 and the end 121 of plate 114 is an alignment pin 118. Clearance openings 117 in alignment plate 114 which can have an open end as shown in FIG. 9 or be an opening fully encircled by material. When the alignment plate is attached to the ground/mounting strap, openings 128 in the ends 122 of the ground/mounting strap are clearance openings for alignment pins 118 and are aligned with openings 134 in the multi-function clips 130, 151. Thus, the alignment pins are positioned to enter openings 134 in multi-function clips 130, 151 attached to the lower and upper ends of the ground/mounting strap 123 of the wiring device as the wiring device is being attached to the alignment plate. Alignment plate 114 can have two ribs 119 and has a downwardly extending tab 120 which extends from the bottom edge and is used to facilitate removal of a wall plate from around the face of the wiring device. The alignment plate 114, when attached to the wiring device, covers the box in which the wiring device is installed. The alignment plate 114 shown in FIG. 9 is for a single wiring device.

The alignment plate 114 helps to overcome difficulties encountered with respect to mounting and positioning wiring devices such as one or more switches, a switch and/or a receptacle, or one or more receptacles to a box prior to placing a wall plate around the wiring devices. Prior to mounting a wall plate, various difficulties can be encountered such as aligning the wiring devices with each other, positioning the wiring devices to be parallel to each other, adjusting the spacing between the wiring devices to be equal and uniform and fixing all of the wiring devices to be flat against the wall. These difficulties are overcome with alignment plate 114 which has a single opening and a pair of alignment pins in combination with multi-function clips. The opening in the alignment plate is sized to receive one or more wiring devices which are to be positioned side by side in a box and the alignment plate has a pair of alignment pins 118 which hold and accurately position each of the wiring device relative to each other and along a flat plane. Each set of alignment pins on the alignment plate is located on a vertical axis which defines the center for a wiring device and each wiring device has a multi-function clip at each end of the ground/mounting strap for frictionally receiving and holding captive the alignment pins on the alignment plate. When being assembled, the wiring devices are first attached to the alignment plate and the alignment plate, which now holds captive the wiring devices, is attached to a wall box by means of mounting screws. Thereafter, a wall plate is positioned around the wiring devices without requiring any further adjustments by simply pressing the wall plate in toward the wall to allow the ends 149 of the latching pawls 140 of the multi-function clips to engage teeth on the inside ends of the wall plate.

The multi function clips, in addition to clamping the wall plate to the ground/mounting strap, helps to overcome various difficulties encountered with respect to mounting and positioning one or more electrical wiring devices to a box to allow a wall plate to be quickly and easily positioned around the wiring devices and to also be flat against the wall. Each wiring device according to the present invention has at each end of the ground/mounting strap a multi-function clip that has locating openings 134 for receiving and engaging alignment pins 118 on the alignment plate 114. The pins on the alignment plate, when engaged by the close clearance locating openings 134 in the multi-function clips, accurately positions each wiring device in all directions, sideways, up, down, and the plate itself positions the wiring device along a flat plane to allow a wall plate to be positioned around a single wiring device or a gang of wiring devices without any initial or subsequent adjustment being required. Each pair of alignment pins on the alignment plate is located on a substantially vertical axis which accurately defines the center of a wiring device, although it is within the scope of the present invention to provide other alignments, as well. The opening 134 in each multi-function clip receives and holds captive an alignment pin 118. The multi-function clips, in cooperation with the alignment pins, accurately positions and aligns all wiring devices mounted on the alignment plate. As is disclosed below, the alignment plate can be made to receive one or more wiring devices. After the wiring device(s) are attached to the alignment plate, the wiring device(s), together with an alignment plate are attached to a wall box by means of threaded fasteners such as screws which pass through openings 132 of the multi-function clips, openings 127 in the ground/mounting strap and openings 117 of the alignment plate. The alignment plate provides a substantially flat rigid support for the wiring devices and insures that all the wiring devices are accurately positioned to allow a wall plate to be placed around the wiring devices without requiring any further adjustment.

During assembly, the electrical cables in the box are stripped of insulation and are attached to terminals on the side or back of a wiring device such as a switch or receptacle. After the wires are attached to the wiring device, the alignment plate is positioned behind the wiring device by threading the wiring device through the opening in the alignment plate. The front face of the alignment plate is now moved toward the back face of the ends of the ground/mounting strap. As the alignment plate moves toward the wiring device, the alignment pins 118 on the alignment plate enter openings 128 in the strap and openings 134 in clips 130. As the alignment pins enter the openings 134, they force the upwardly bent projections 133 to resiliently move upward and spread slightly apart to allow the alignment pins to fully enter openings 134. The ends of the upwardly bent projections engage and hold captive alignment pins 118 and strongly resist backward movement and withdrawal of the pins from the openings 134. The switch or receptacle which is now attached to the alignment plate and is connected to the electrical wires, is inserted into the box. As the wiring device is inserted into the box, screws 108 located in openings 132 in the multi-function clips and clearance openings 117 in alignment plate are aligned with and threaded into openings 23 to hold both the alignment plate and wiring device(s) to the box and wall surface. The head of the screw which passes through opening 126 of the end of the ground/mounting strap of the wiring device and opening 132 in the clip is larger than either opening and, therefore, holds the wiring device and alignment plate 114.

The wall plate is now placed over the installed wiring devices. It is to be noted (see FIGS. 3, 4 and 5) when the wiring device is the switch here disclosed, the paddle of switch 110 is frameless. It is not located within a frame. Thus, the switch must be accurately positioned within the wall plate to insure that the paddle is free to move without touching any surface of the wall plate or a side surface of an adjacently positioned wiring device.

Each multi-function clip 130, 151 contains two side-by-side latching pawls 140. See FIGS. 12–13A. Each latching pawl 140 is bent downward toward the back of the wiring device by about 40 degrees. After the wiring device is attached to the alignment plate, the two latching pawls 140 of the multi-function clip at the bottom end of the wiring device straddles tab 120 on the alignment plate. Tab 120 (see FIG. 36) functions as a tool pivot point to allow the wall plate 138, when attached to the alignment plate, to be easily removed from around the switch or receptacle. A slot 74 in the lower edge of the wall plate 138 provides access for the insertion of a small flat tool such as a screw driver to facilitate removal of the wall plate from the wiring device.

Wall plate 138 is proportioned to fit over alignment plate 114, the ends 122 of the ground/mounting strap 123 and the box within which the wiring device is located. The wall plate 138 is located around the wiring device and locked in position by pushing the wall plate toward the wiring device until the ends of the latching pawls 140 engage teeth on the inside wall of the top and bottom edges of the wall plate.

Figure 15:
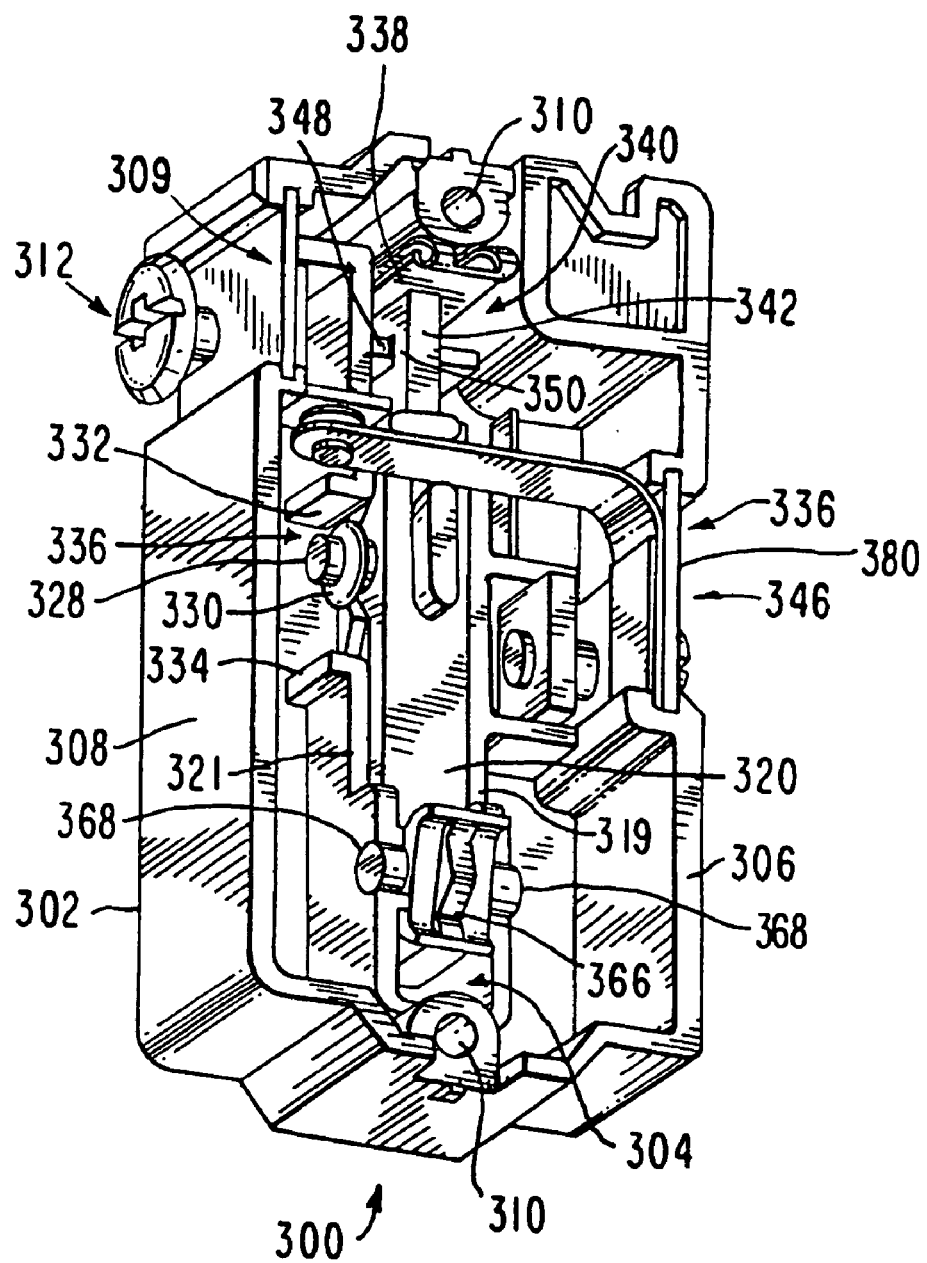
FIG. 15 is a perspective view of the base assembly of the switch of FIG. 14.
Figure 16:
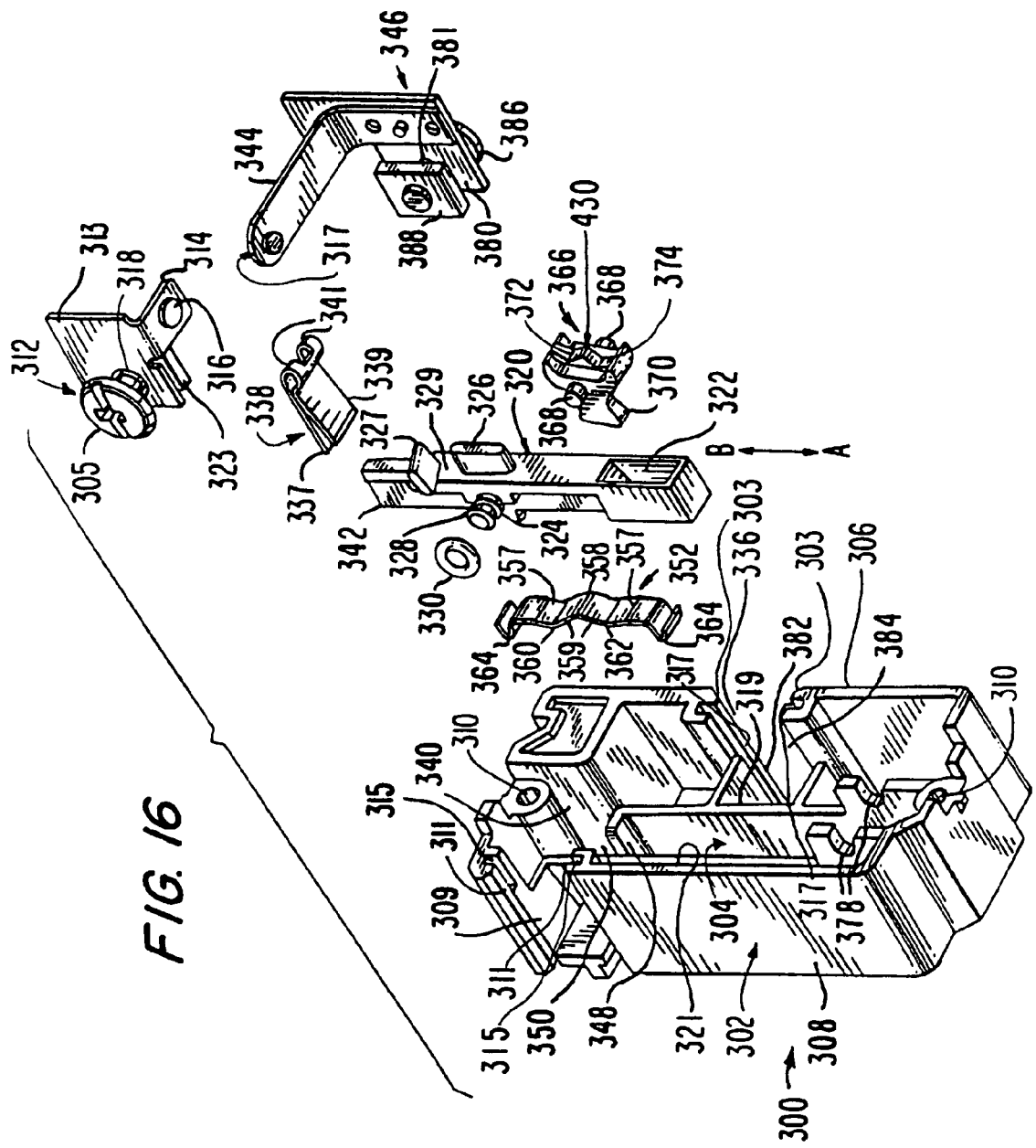
FIG. 16 is an exploded view of the base assembly of FIG. 15.
Figure 21A:
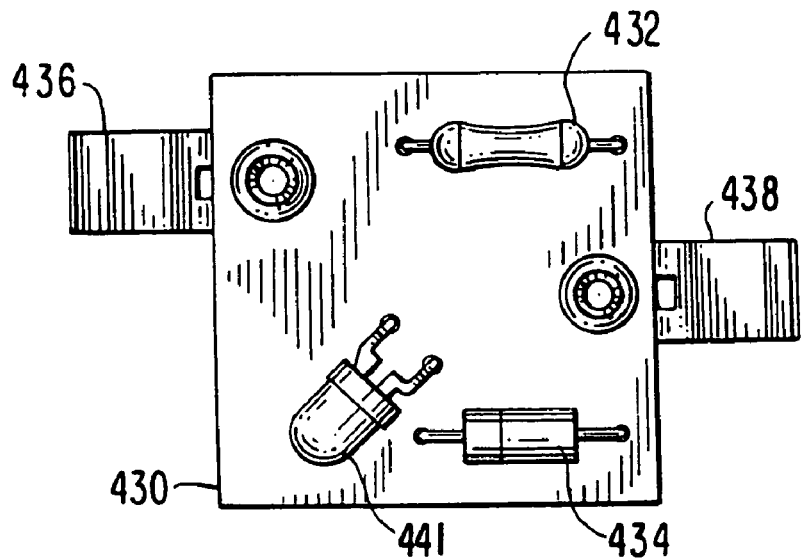
FIG. 21A is a plan view of the light assembly board.
Figure 21B:
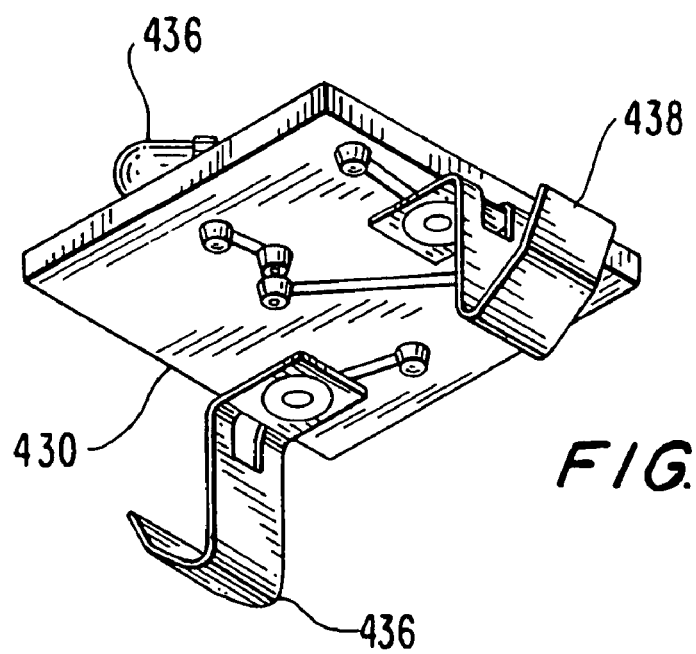
FIG. 21B is a bottom perspective view of the light assembly board.
Figure 22:
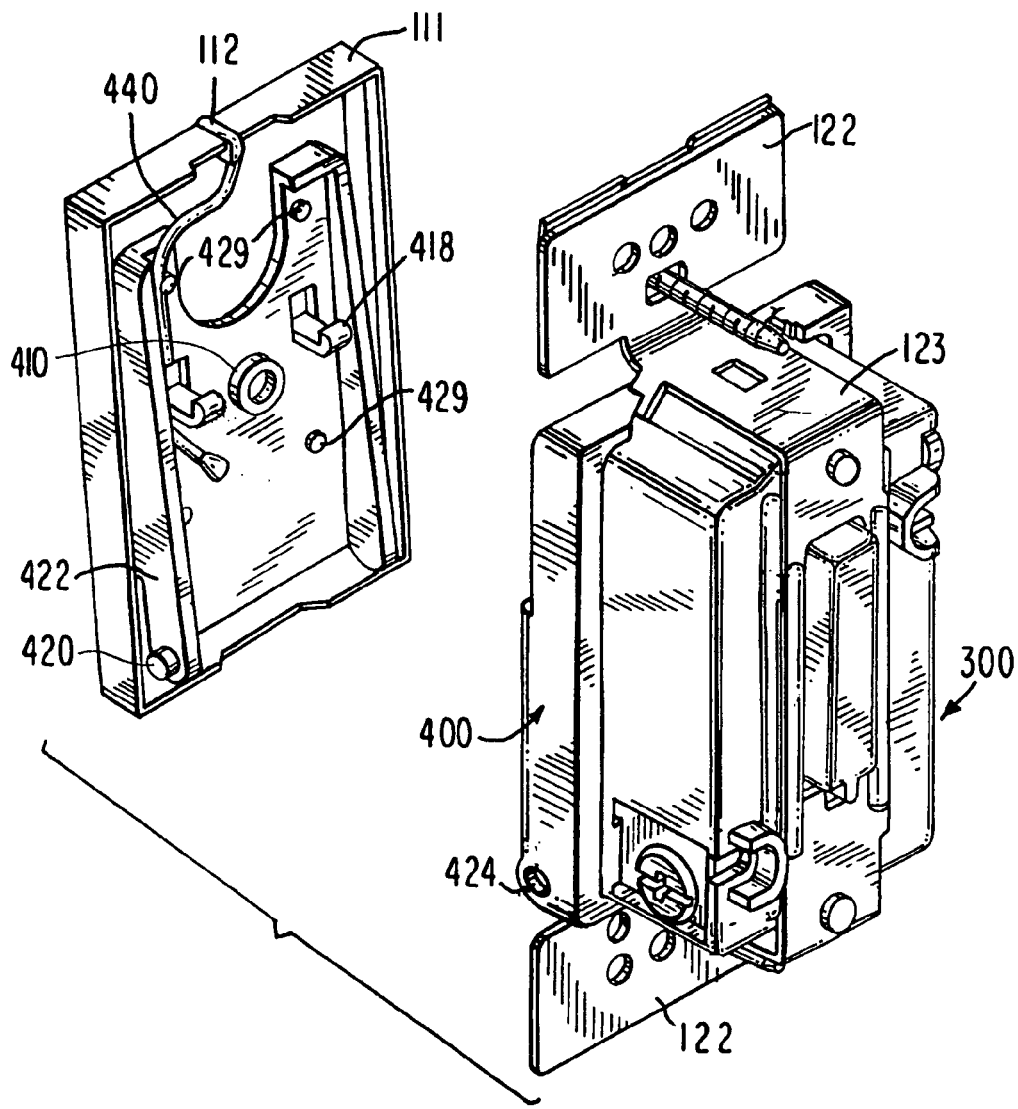
FIG. 22 is a perspective exploded view showing the light pipe in the paddle of the switch.
Figure 23:
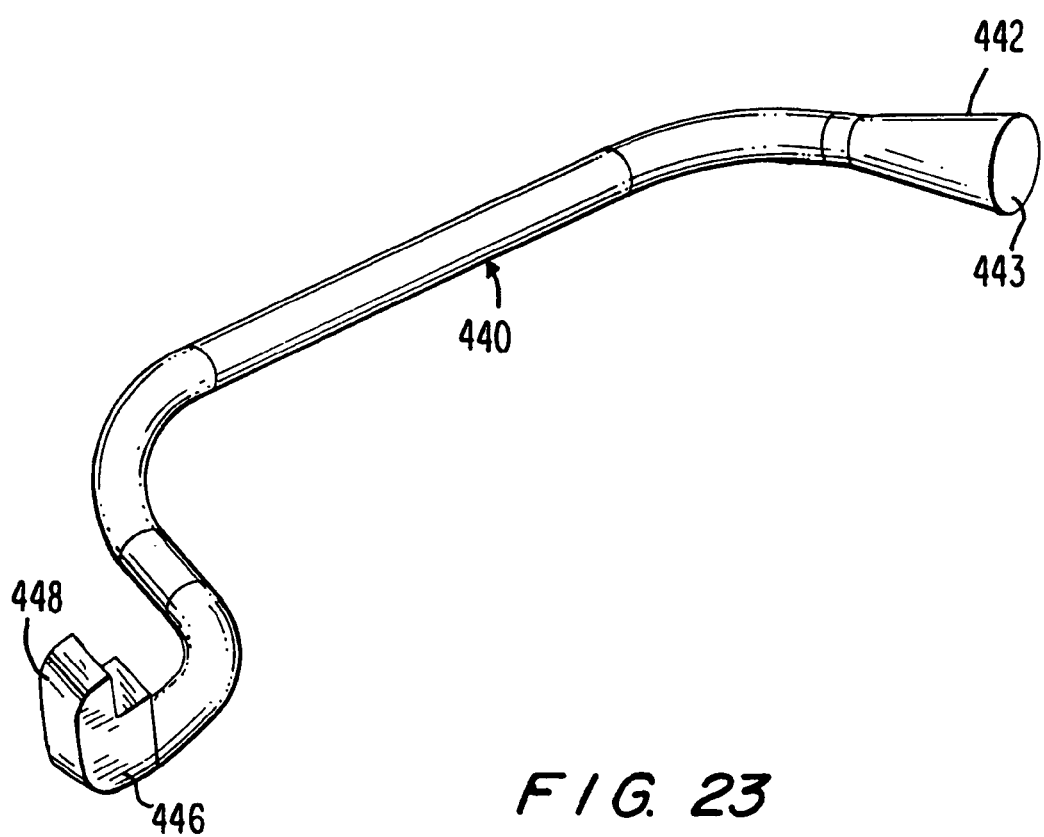
FIG. 23 is a perspective view of the light pipe.
Figure 24:
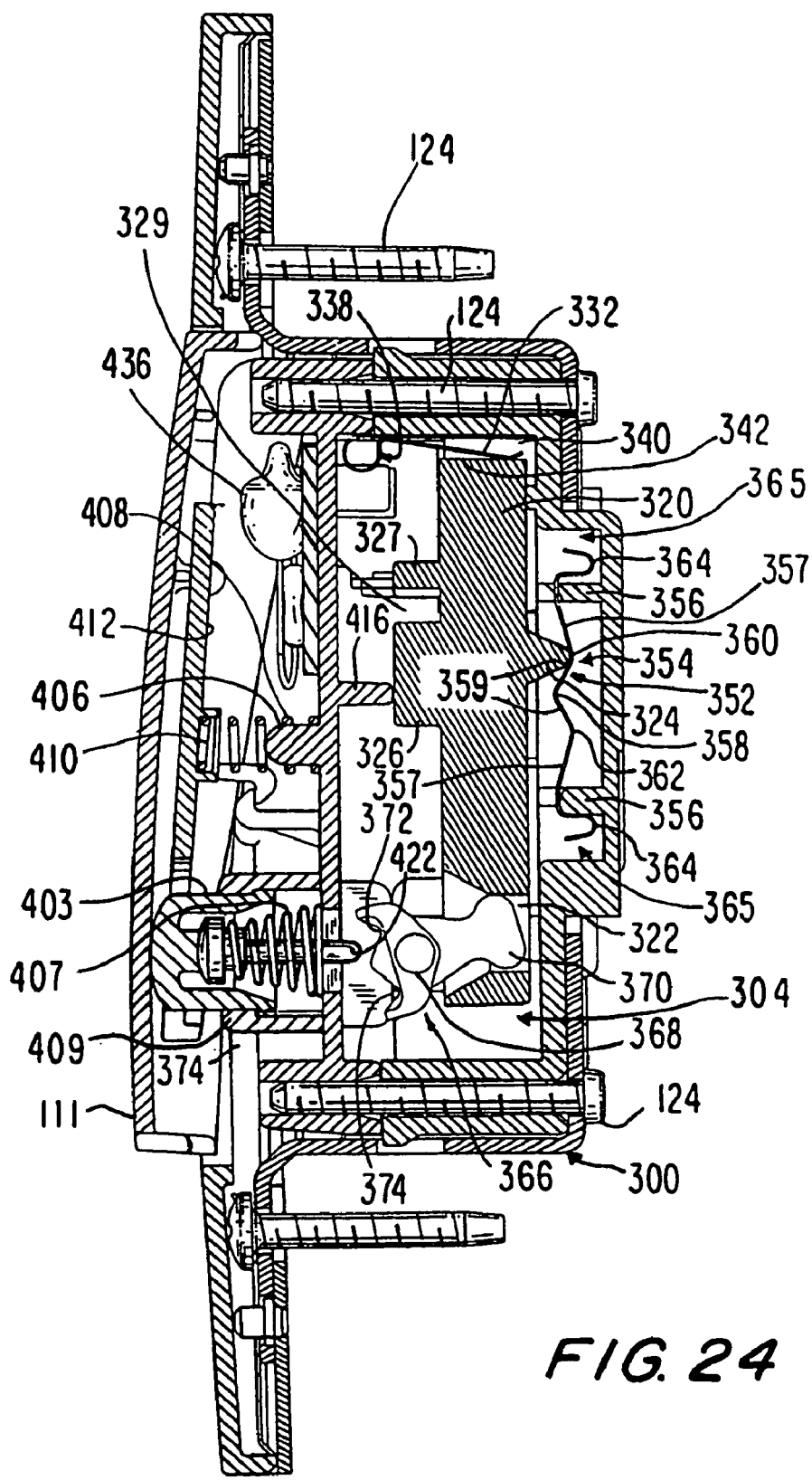
FIG. 24 is a sectional view along the line 24—24 of FIG. 3.

Referring to FIGS. 14–24, there is shown in detail multiple views of the switch and components of the switch of FIGS. 3–5. More specifically, FIG. 14 is an exploded view of a switch in accordance with the principles of the invention; FIG. 15 is a perspective view of the base assembly of the switch of FIG. 14; FIG. 16 is an exploded view of the base assembly of FIG. 15; FIG. 17 is another exploded view of the switch; FIG. 18 is still another exploded view of the switch; FIG. 19 is a partial sectional exploded view of the cam driver of the switch; FIG. 20 is a perspective exploded view of the switch showing the light assembly board; FIG. 21A is a plan view of the light assembly board; FIG. 21B is a bottom perspective view of the light assembly board; FIG. 22 is a perspective exploded view showing the light pipe in the paddle of the switch; FIG. 23 is a perspective view of the light pipe; and, FIG. 24 is a sectional view along the line 24—24 of FIG. 3.

Referring to FIG. 14, there is shown an exploded view of base assembly 300 and frame assembly 400 which, when joined together and coupled to paddle 112 forms a single pole switch, and FIG. 15 which shows a perspective view of the base assembly 300. Base assembly 300 includes shell member 302 composed of electrically insulating material and having a longitudinal channel 304 which extends along the length of shell member 302 and is centrally located between the side walls 306, 308 of member 302. Channel 304 is sized to receive a slider 320 (see FIG. 16) which slides back and forth in channel 304. Located in shell member 302 and beyond each end of channel 304 are clearance openings 310 for receiving fastening means 124 such as rivets, screws or the like to lock the ground/mounting strap 123, the base assembly 300 and the frame assembly 400 together. Side wall 308 of the shell member has an opening 309 adapted to receive a stationary terminal assembly 312 and side wall 306 has an opening 336 for receiving brush terminal assembly 346, each more fully shown in FIG. 16.

Referring to FIG. 16, stationary terminal 312 consists of a rectangular plate 313 and a substantially non-yielding contact bearing arm 314 bent at a right angle to the plate and having a contact 316. Stationary terminal 312 is of conducting material such as brass, etc. An inverted U shaped slot 318 located in rectangular plate 313 is a clearance opening for terminal screw 320 which threads into pressure plate 323 located behind plate 313. In operation, as terminal screw 320 is tightened, the bottom surface of the head of screw 320 and pressure plate 323 move toward each other to clamp the rectangular plate 313. Stationary terminal assembly 312 is adapted to be connected to an electrical conductor by either placing a turn of electrical conductor such as a wire under the head of the screw 320 or by inserting a straight end of the conductor between the pressure plate 323 and the rectangular plate 313, and then tightening screw 320 to lock the conductor between either plates 313 and 323, or the plate 313 and the head of the screw 320. Looking at side wall 308 of shell member 302, each of the two side edges 311 of opening 309 contain a vertical slot or rail 315 provided to receive and hold the side edges of rectangular plate 313. Sliding the rectangular plate 313 of the stationary terminal assembly 312 down into the slots or rails 315 in the edges of the opening 309 positions and holds the stationary terminal assembly 312 in position within the opening 309 of side wall 308 of shell member 302.

Brush terminal assembly 346 includes a rectangular plate 380 composed of electrical conducting material such as brass etc., which supports a yieldable contact bearing arm 344 having a contact 317. An inverted U shaped slot 381 located in rectangular plate 380 is a clearance opening for terminal screw 386. Terminal screw 386 freely passes thru clearance opening 381 and threads into pressure plate 388. Tightening terminal screw 386 clamps the rectangular plate 380 between the bottom surface of the head of the screw 386 and the pressure plate 388. Brush terminal assembly 346 is adapted to be connected to an electrical conductor by either placing a turn of the conductor under the head of the screw or inserting a straight end of the conductor between the pressure plate 388 and the rectangular plate 380. Tightening the screw 386 locks the conductor between the screw head and plate 380, or between plate 380 and pressure plate 388. Looking at side wall 306 of shell member 302, the two edges 303 of opening 384 each has a narrow vertical slot or rail 317 for receiving and holding the side edges of rectangular plate 380. Sliding rectangular plate 380 of brush terminal assembly 346 down into slots or rails 317 in the edges of opening 384 positions and holds the brush terminal assembly in opening 384 of the side wall 306 of the shell member 302.

The stationary terminal assembly 312 and the brush terminal assembly 346 are made of conductive material so that a circuit can be completed between the conductive wires connected to screw terminals 320, 386. Preferably, the conductive components are all of substantial grade, good quality electrical materials so that substantial currents, for example 10 or 20 amperes, can repeatedly be carried for extended periods of time without significant heat generation, electrical losses or excessive arcing. Such materials can include silver alloys for the contacts, beryllium copper alloy for the brush arm and brass for the remaining conductive components.

Referring to FIGS. 15 and 16, slider 320, when positioned within channel 304 can freely slide back and forth between the side walls 319, 321 from one end of the channel to the other end of the channel. Slider 320 has, at one end, a rectangular funnel shaped slot opening 322 which extends completely through the slider and is provided to receive cam follower 370 of cam 366. It is understood that the rectangular funnel shaped slot opening 322 in not restricted to an end of the slider, but can be located anywhere along the slider to a place where it is convenient to do so. Projecting downward from the bottom surface of slider 320 and about mid-way between the ends of the slider is a triangular shaped cam follower 324. Projecting upward from the top surface of the slider 320 and about mid-way between the slider ends is a hold down projection 326. Also projecting upward from the top surface of the slider is a brush terminal control projection 327. The space 329 between hold down projection 326 and brush terminal control projection 327 is provided to receive spring contact arm 344 of brush terminal assembly 346. Movement of the slider 320 in direction "A" causes projection 327 to urge contact arm 344 to bend downward and move away from stationary contact 316. Movement of the slider 326 in direction "B" causes projection 327 to move up which allows contact arm 344 to spring back and allow contact 317 to make electrical contact with contact 316. A bumper support member 328 which projects outward from the side of the slider 320 provides support for a rubber O ring 330. With the slider located in slider receiving channel 304, O ring 330 moves back and forth between stops 332, 334 of opening 336 in side wall 321 (see FIG. 15) as the slider is driven from one end of channel 304 to the other. The O ring is used to cushion the stopping of the slider 320 by contacting stops 332, 334 located at the ends of opening 336 in wall 321. Contact 317 of brush terminal assembly 346 (see FIG. 16) is biased by spring arm 344 to move upward toward stationary contact 316. To help offset some of the upward force exerted by arm 344 which moves contact 317 toward contact 316 as the slider is moved down, a helper spring 338 is provided. Helper spring 338 also helps to balance the feel of the rocker paddle as the switch is operated.

Movable spring contact arm 344 of brush terminal assembly 346 is spring biased to move contact 317 up toward stationary contact 316. Therefore, more force is needed by the slider 320 to move contact 317 on spring contact arm 344 out of engagement with stationary contact 316 than is needed to close the contacts. Referring to FIG. 16, helper spring 338 is used to help overcome this force. Helper spring 338 is a strip of flat spring metal folded about its center with a generous radius to have two legs 337, 339 which forms an inverted V. The inverted V shaped helper spring 338 fits in chamber 340 located at the top end of channel 304 (see FIG. 16) with the apex of the V being at the top of the channel. As slider 320 is moved up, the spring bias of spring contact arm 344 assists in closing contacts 316, 317. As the slider moves up and the contacts close, the end 342 of slider 320 contacts leg 339 of helper spring 338 and urges it to move toward leg 337. At this time, helper spring 338 is compressed and now biases slider 320 to move down. When the contacts 316, 317 are being opened, helper spring 338 urges slider to move down against the force of the spring contact arm 344. Thus, spring 338 helps to overcome the force exerted by the spring contact arm 344 of the brush terminal 344 on the slider when the spring contact arm 344 is being moved down to open the contacts 316, 317.

Wall 348 at the end of chamber 340 contains a slot opening 350 which allows the end 342 of slider 320 to enter chamber 340 to engage and move leg 339 toward leg 337 of helper spring 338. Wall 348 helps to keep helper spring 338 within the chamber 340.

As seen in FIG. 24, located directly beneath slider receiving channel 304 and opening into channel 304 is spring chamber 354. Spring chamber 354 is elongated, has a rectangular cross-section and contains a flat cam shaped leaf spring 352. The spring chamber 354 can be centrally and symmetrically disposed in the switch base 300 and has support bars 356 at each end for supporting flat cam shaped leaf spring 352. Located beyond each support bar 356 is an end pocket 365. The overall length of chamber 354 is determined by the length of the flat cam shaped leaf spring 352.

Cam shaped leaf spring 352 is formed from a flat resilient steel strip, preferably spring steel, and has a profile substantially similar to that shown in FIG. 22. The flat cam shaped leaf spring 352 has a profile that is symmetrical about a center apex 358. Moving along the spring 352 from the apex to the ends, the spring has a short down sloping cam portion 359 on each side of the apex 358 which, together with support sections 357 forms a depression 360, 362 at each side of the apex. The support sections 357 rest on support bars 356 and terminate in U shaped outer end portions 364 which resides in end pockets 365. The apex 358, the centrally located rise of the spring and the flat short cam portions 359 on each side of the apex and joined by support sections 357 provide a surface discontinuity rather than a smooth transition for the cam 324 as it travels over the apex.

Referring to FIGS. 16 and 24, cam 366 is used to move the slider back and forth between its left and right hand positions which corresponds to the off and on position of the switch. Cam 366 has two cylindrical shaped projections 368 which are aligned with each other and extend out from the sides to form an axel support shaft rotatably received by support bearing openings 378 located in side walls 319, 321 of the slider receiving channel 304. In operation, cam 366 can rock back and forth in a clockwise and counterclockwise direction about the axel defined by the projections 368. Extending downward and below projections 368 is cam follower 370 which fits in the rectangular funnel shaped slot opening 322 in slider 320 with minimum clearance. Extending upward from projections 368 is cam control surface 430 having a first pocket 374 located at the left of the cam, and a second pocket 372 located at the right of the cam. Looking at the profile of the cam 366 as shown in FIG. 24, pocket 372 is at the right side of the axes of rotation of the cam, and pocket 374 is at the left side of the axes of rotation of the cam. Thus, when the slider is at its right hand position, application of a downward force on pocket 372 will cause the cam follower 370 to rotate in a clockwise direction to cause slider 320 to move to the left. In a similar way, application of a downward force on pocket 374, when the slider is at its left hand position, will cause the cam follower 370 to rotate in a counterclockwise direction to cause the slider to move to the right. Thus, pressing down on pocket 372 causes the cam to rotate clockwise which causes the cam follower 370 to move the slider to the left. Thereafter, pressing down on pocket 374 will now cause the cam to rotate counterclockwise to cause the cam follower to move the slider to the right. Alternately pressing on pockets 372 and 374 will cause the slider to move back and forth, first in one direction and then in the other direction.

Projecting upward from the bottom member 401 of frame assembly 400, and of the same material as the bottom member, are two hook members 396 (see FIGS. 16 and 18) which engage and pivotly hold cooperating hook members 418 (see FIG. 17) which project down from subplate 412 of the rocker assembly 398. Frame assembly 400 includes a rectangular clearance opening 402 located in bottom member 401 which is aligned with the top of cam 366 and through which an actuator 405 (see FIGS. 18 and 19) of cam driver 431 projects to engage and operate cam 366.

The cam 366 is operated by articulated cam driver 431 (FIG. 19) which consists of a cylindrical shaped member 409, a plunger 403, an actuator 405, and a conical shaped coil spring 407. The cam driver 431 engages and drives cam 366, first in a clockwise direction, then in a counter-clockwise direction each time plunger 403 is moved down. The open ended cylindrical shaped member 409 supports two ears 411, each having a threaded opening for receiving a holding member such as a screw to secure the member 409 to frame assembly 400. Member 409 contains a first opening 413 at its lower end and a second opening 415 at its upper end. The first opening 413 at the lower end of the cylindrical shaped member 409 is sufficiently large to avoid obstructing or interfering with the rectangular clearance opening 402 when the member 409 is mounted to bottom member 401 of the frame assembly 400 and is positioned over opening 402. The cylindrical shaped member 409 supports an internal, inwardly projecting ridge 417 located between the first 413 and second 415 openings.

Plunger 403 slidably fits within member 409. The outside diameter of plunger 403 is slightly smaller than the diameter of the second opening 415 in the upper end of cylindrical shaped member 409 which allows the plunger to move up and down in opening 415 without binding. Plunger 403 has a skirt 429 which has, at its end, an external, outwardly projecting ridge 433. Shoulder 417 in cylindrical shaped member 409 and ridge 433 on the plunger 403 engage each other to keep plunger 403 captive within member 409.

Actuator 405, which can be composed of cold rolled steel or a plastic having suitable characteristics supports an elongated shaft 421 having a generous radius at one end and first 423 and second 425 collars at the other end. Collar 423 is smaller in diameter than collar 425 and is adapted to be frictionally connected to the smaller diameter end of conical spring 407. The end of the second collar 425 is located within opening 428 of plunger 403 and contacts internal projection 427.

Coil spring 407 has a conical shape, the apex of which is wrapped around and frictionally engages collar 423 and the base of spring 407 is sufficiently large in diameter to extend beyond the rectangular clearance opening 402 to avoid interfering with shaft 421 as it pivots back and forth in the rectangular clearance opening 402. Opening 402 has a long dimension along the length of the switch and a small dimension along the width of the switch. The small dimension of opening 402 is slightly larger than the diameter of shaft 421 to permit the shaft 421 to move in opening 402 without binding and the long dimension of opening 402 allows shaft 421 to engage and operate cam 366 without binding.

A small projection 406 which extends upward from the bottom 401 of frame assembly 400 and of the same material as the bottom member can be used to engage the lower end of a helper helical spring 408 which is provided to urge the rocker paddle 112 to its out position. In normal use, the spring 407 will provide sufficient force to urge the paddle 112 away from frame assembly 400. However, in those instances where additional force may be desired, helper spring 408 can be present. The outside diameter of the projection 406 is slightly less than the inside diameter of helical helper spring 408 and fits within an end of the helical helper spring. The upper end of helical helper spring 408 is located within and held captive in a pocket 410 (see FIG. 17) located in subplate 412. Subplate 412 is secured to the underside of the rocker paddle 112 by adhesive, by plastic projections which extend from the underside of the rocker paddle and, after passing through openings in the subplate are staked over, or the like.

Referring to FIG. 17, there is shown a perspective exploded view of the bottom of base assembly 300, frame assembly 400 and rocker assembly 398 of a single pole switch. Referring to the frame assembly 400 which can be a unitary member formed of a suitable plastic, two projections 414 project out from the bottom surface and are positioned to contact the top surface of the axel support shaft formed by aligned cylindrical projections 368 of the cam 366. Projections 414 prevent the cylindrical projections 368 from moving out of their bearing surfaces in the side walls of the slider receiving channel. Also projecting downward from the bottom surface of the frame assembly 400 is a slider hold down projection 416 which slidably contacts projection 326 on the slider 320. Projection 416, by contacting projection 326 on slider 330, prevents slider 320 from being pushed up and out of channel 304 by the upward force of cam profile leaf spring 352 pushing up on triangular shaped cam follower 324.

The subplate 412 is attached to the underside of paddle 112 and is a unitary member of a plastic material having two hook shaped members 418 formed thereon which project down from the bottom surface. The hook shaped members 418 are positioned to engage hooks 396 on the frame assembly 400. Hooks 418, when engaged by hooks 396, allow the rocker assembly to move toward and away from the frame assembly 400 and, at the same time, prevent the subplate and attached rocker paddle from being separated from the frame assembly 400. A downward extending ring 410 on the subplate 412 is aligned with projection 406 on the frame assembly to provide an anchor for the top end of helper spring 408 when a helper spring is used. The inside diameter of ring 410 is slightly larger than the outside diameter of the helper spring to permit the end of the helper spring to be placed within ring 410. Two arms 422 which project beyond the rear end of the subplate 412 each supports a circular stud 420, one on the outside end of each arm, are axially aligned with each other to form a common axel. The studs snap into openings 424 in the frame assembly 400 to form a hinge about which the subplate and the rocker paddle 112 to pivot relative to the frame and base assemblies. The subplate 412 is secured to the bottom surface of the rocker paddle 112 to form a unitary assembly with an adhesive, by heat staking or the like.

The switch here disclosed can have an on-off indicating means such as a light to indicate when the switch is in its conducting state and when in its non-conducting state. The on-off indicating light can be of a color or white. In practice, a blue light was found to be preferred. Referring to FIGS. 21A and 21B, there is shown the top and bottom of a Printed Circuit Board (PCB) which fits within the frame assembly 400. Located on the top surface of the board 430 is a resistor 432, a diode 434 and an LED 436 connected together and to spring terminals 390. Referring to FIG. 14, frame assembly 400 fits on top of base assembly 300 and provides support for the PCB and has openings for the spring contacts 390 to project through the frame assembly and make contact with plate 313 of the stationary terminal assembly and plate 380 of the brush terminal assembly 346. LED 436 indicates the conductive state of the switch by being "on" or "off". In operation, lamp 394 will be "on" when the contacts of the switch are open, and the lamp will be "off" when the contacts of the switch are closed.

Referring now to FIG. 23, there is shown a light pipe 440 which is connected to the underside of the paddle (see FIG. 22) to optically connect the LED to a window 442 in the lower end of the paddle. The end of the light pipe adjacent to the LED has a spherical face for receiving light from the LED, and the other end of the light pipe has a diffuser texture exit surface which is the window in the edge of the paddle.

Referring to FIG. 24, to assemble the switch, the helper spring 338 is inserted into end chamber 340, leaf spring 352 is place into spring chamber 354 and slider 320 is placed into channel 304. The end 342 of the slider faces the helper spring 338 and the triangular shaped cam follower 324 which projects from the bottom of the slider slidably engages the top surface of leaf spring 352. Projecting cylindrical studs 368 of cam 366 are placed within bearing surface openings 378 in side walls 319, 321 of channel 304 with cam follower 370 being positioned within opening 322 of slider 320. Stationary terminal assembly 312 is positioned in the opening 309, and brush terminal assembly 346 is positioned within opening 384. As the brush terminal assembly 346 is being placed in position, the spring contact arm 344 is moved backward against the force of the spring arm and is positioned within slot 329 located between the holding down projection 326 and the spring contact arm control member 327 of slider 320. At this time all the various components have been placed within the switch base 300 and the assemblage resembles that shown in FIG. 24.

Referring now to the frame assembly 400 and the cam driver 431, plunger 403 is positioned within the cylindrical shaped member 409 by inserting the plunger 403 through the bottom opening of the cylindrical shaped member 409 until the outwardly extending ridge 421 at the end of the skirt of the plunger engages inwardly projecting ridge 417 of the plunger. Thereafter, actuator 405 is inserted through the bottom opening of the cylindrical shaped member 409 and into the plunger until the top surface of collar 425 contacts internal projection 427 which extends downward from the inside surface of the top of the plunger 403. Conical shaped coil spring 407 is now inserted through the bottom opening of the cylindrical shaped member 409 and placed around the actuator 405 with the apex of the coil spring being positioned around the collar 423. At this time the assembled cam driver 431 is positioned onto the bottom member 401 of the frame 400 with the actuator being positioned to freely move through elongated opening 402 and the clearance openings in the frame being aligned with the threaded openings in the ears of the cylindrical shaped member.

The frame assemblage 400, which includes the LED, resistor, diode and contacts 390, is now placed over the switch base, a ground/mounting strap is placed along the bottom and ends of base assembly 300, and screws, drive pins, rivets or the like 124 are used to lock the ground/mounting strap, switch base assemblage and frame assemblage together. In the embodiment shown, the conical shaped coil spring 407 exerts an upward force on the actuator and the plunger to maintain the plunger in its extended most outward position. The subplate has a cutout 433 through which the plunger 403 passes to contact the underside of the rocker paddle 112. Thus, top surface of the plunger contacts the bottom surface of the rocker and it is the upward force of the spring 407 that biases the rocker to its outward position and that a user must overcome when the switch is being operated. In some instances, it may be desirable to have a switch which requires a greater force to operate. If a greater force is desired, it can be obtained with a helical spring 429 where the lower end is placed over projection 406 on the frame and the top is placed within the spring pocket 410 of the subplate. The projections 420 on the legs 422 are snapped into the openings 424 in the frame assembly 400 to form the hinge which allows the rocker assembly 398 and the frame assembly 400 to pivot relative to each other. Thereafter the rocker assembly 398 which includes the subplate, is pressed down toward the frame assembly until hooks 418 engage hooks 396. At this time the bottom or underside of the rocker assembly contacts the top surface of the plunger 403 and the application of finger pressure on the rocker assembly will move it toward the frame assembly against the force of spring 407 to drive the elongated shaft 421 of the actuator 405 down through the opening 402 to engage the cam eccentric surface 372.

FIG. 24 is a sectional view of a single pole switch where the contacts of the switch are closed and the switch is in its conducting state. The next time the face of the rocker paddle is pressed, plunger 421, acting against the force of spring 407, is urged to move down to contact the ramp 430 of cam 366 and slide toward the right and enters pocket 372. Continued pressing on the rocker paddle causes the actuator 405 to continue to move down and rotate cam 366 clockwise about cylindrical projections 368. This causes cam follower 370 to rotate in a clockwise direction and move slider 320 to the left. As slider 320 moves toward the left, the triangular shaped cam follower 324 moves out of depression 360 of the spring and across the right support section 359 toward the centrally located apex 358 of the cam shaped leaf spring 352. As the slider continues to move to the left, triangular shaped cam 324 deflects leaf spring 352 downward because projection 326 on slider 320, in cooperation with holding projection 416, prevents the slider 320 from moving upward. As the triangular shaped cam 324 moves over the top of the apex 358 of the spring and toward the left support section 359 of the apex, the leaf spring starts to spring back to its original unstressed position by moving up. This upward movement of the leaf spring acts on the shaped cam follower 324 and helps drive and accelerate the cam follower 324 and the slider 320 to the left until the cam follower 324 comes to rest in depression 362. At this time the contacts of the switch are separated from each other. Thus, the cam shaped leaf spring 352, in combination with the cam follower 324 helps to move the slider to either the left or right depressions 362, 360 to rapidly open and close the contacts. The next time that the rocker is depressed, the actuator 405 will enter pocket 374 of the cam to cause it to rotate in a counter-clockwise direction which will cause the slider to depress the leaf spring as it moves to the right. As the cam follower 324 continues to move to the right and as it passes apex 358, the depressed leaf spring starts to spring up to return to its original position. This upward movement of the leaf spring causes the cam follower 324 to move toward the right until it reaches depression 360 at which time the switch contacts are closed. Continued pressing and releasing the rocker paddle of the switch alternately opens and closes the contacts of the switch. The state of conduction of the switch can be displayed to a user by light from an LED, a neon lamp or a pilot light connected across the stationary and brush terminal assemblies. When the contacts of the switch are closed, there is no potential difference across the lamp-resistor combination and the lamp will remain dark. When the contacts of the switch are open, there will be a potential difference across the lamp-resistor combination and the lamp will be lit.

Figure 25A:
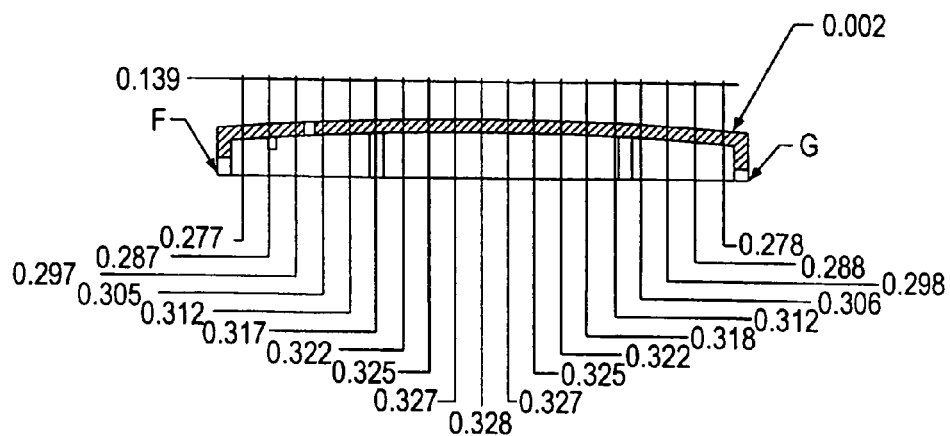
FIGS. 25A–25C are sectional views along the line 25A—25A, 25B—25B, 25C—25C of the paddle of FIG. 14.
Figure 25B:
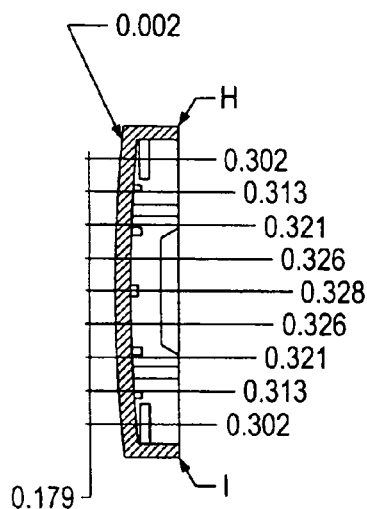
Figure 25C:
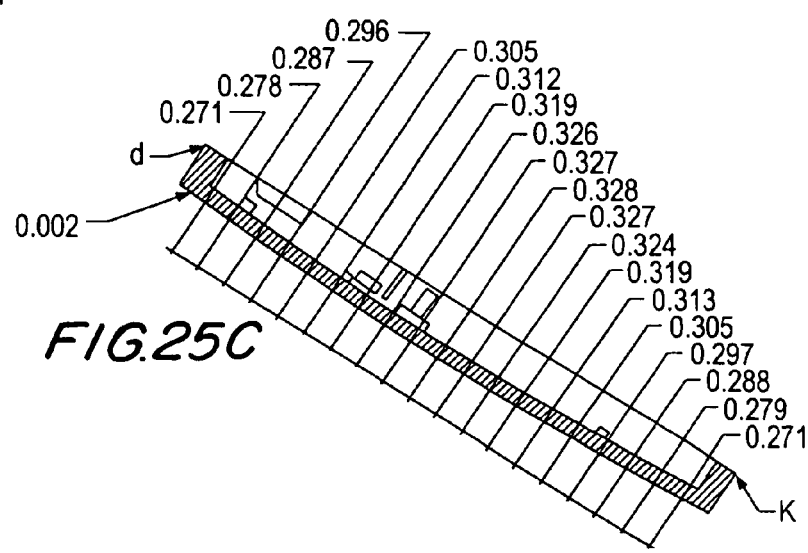

Referring to FIGS. 25A, 25B and 25C, there is shown sectional views of paddle 112 of the switch of FIG. 14. FIG. 25A is a section along the line A—A of FIG. 14; FIG. 25B is a section along the line B—B of FIG. 14; and, FIG. 25C is a section along the line C—C of FIG. 14. The width of the paddle is 1.79 inches and the length of the paddle is 2.77 inches. The face of the paddle has a vertical axis along its length and a horizontal axis along its width where the face of the paddle along its vertical axis has a contour of positive first differential comprised of a combination of splines drawn between points of varying distances from a datum plane and zero second differential when the rate of height increase of the individual splines is constant. The horizontal axis has a surface with a contour of a positive first differential and negative second differential comprised of a combination of splines drawn between points of varying distance from a datum plane. Referring to FIG. 25A, the surface along line A—A lies between two profile boundaries substantially 0.139 inches apart, perpendicular to datum plane A, equally disposed about the true profile and positioned with respect to a datum plane. The basic dimensions and the profile tolerance establish a tolerance zone to control the shape and size of the surface. The surface is about 2.77 inches in length. Within that length, a contour is defined by the dimensions of about twenty equidistant points which are about 0.139 inches apart. Each dimension indicates that point's distance to a datum plane A, the back, flat surface of the paddle. Moving from left to right in FIG. 25A, the dimensions increase from about 0.277 to about 0.328 inches at the center, and then decreases to about 0.278 inches at the right end. This progression defines a contour of increasing and then decreasing height where the points are connected by individual splines. The points are not connected by a single arc and the rate at which the contour height increases in not constant. The rate of height increase of the individual splines decreases from left to right to the center, and then increases from the center to the right end. Thus, the second differential of the contour is negative from each end toward the center. That is that the difference between some of the points distance dimension from an end toward the center decreases. Thus, from an end to the center, the surface has a contour of positive first differential and negative second differential, comprised of a combination of splices drawn between points of varying distance from a datum plane. This description substantially describes the paddle's face along the lines A—A, B—B and C—C of FIG. 14.

The section along line B—B of FIG. 14 which runs along the horizontal center line of the paddle is shown in FIG. 25B and defines a surface having positive first differential and substantially negative second differential from an end to the center line. The second differential is substantially negative because not all successive points have a constant increase.

The section along line C—C of FIG. 14 which runs along the diagonal of the paddle is shown in FIG. 25C and defines a surface having a positive first differential and substantially negative second differential from an end to the center line. The second differential is substantially negative because not all successive points have a constant increase.

FIGS. 25A–C discloses, in detail, the dimensions of the paddle and, therefore, in the interest of brevity, the dimensions shown in the FIGS. 25A–C are not here repeated.

Figure 26:
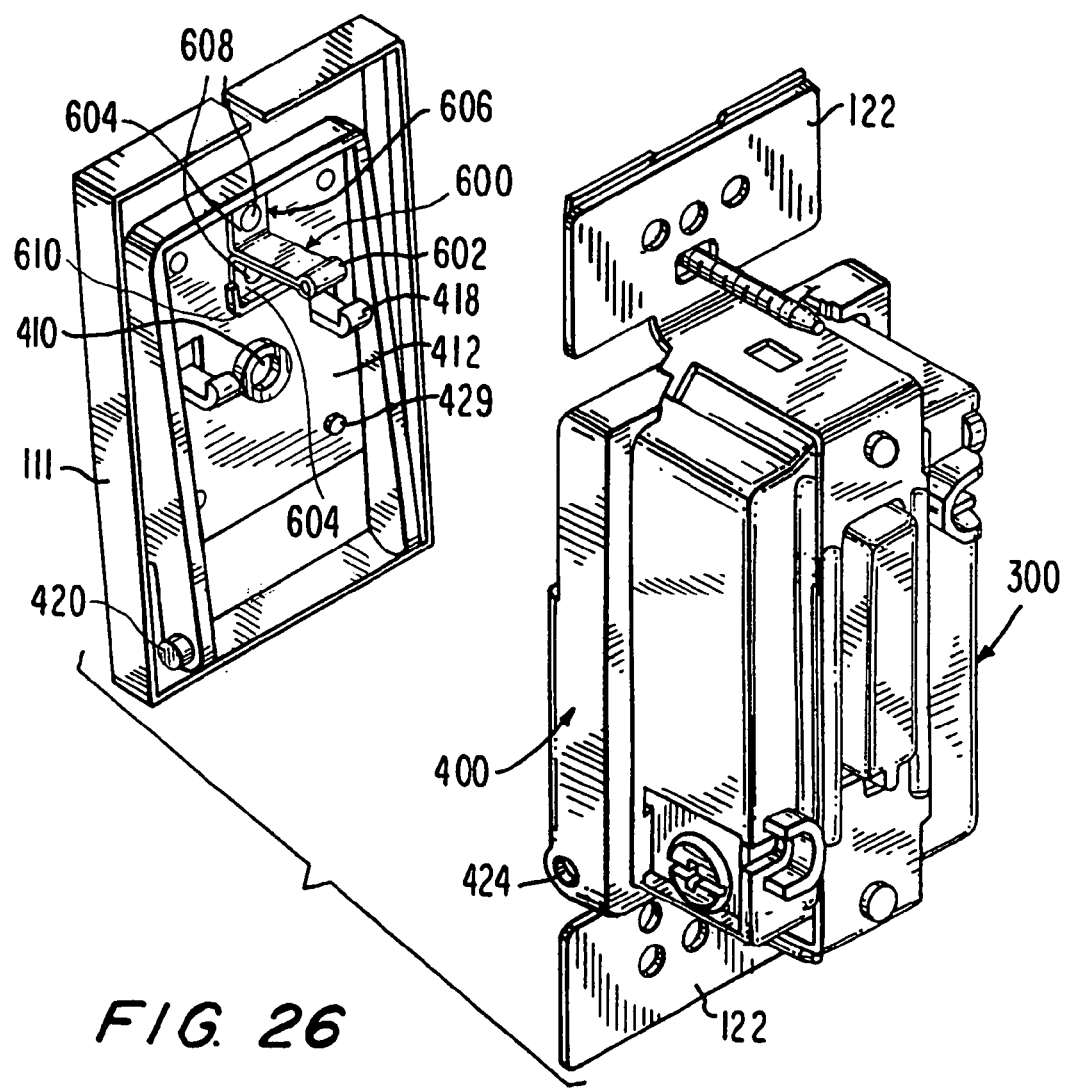
FIG. 26 is a perspective exploded view of the switch with another cam driver.
Figure 27:
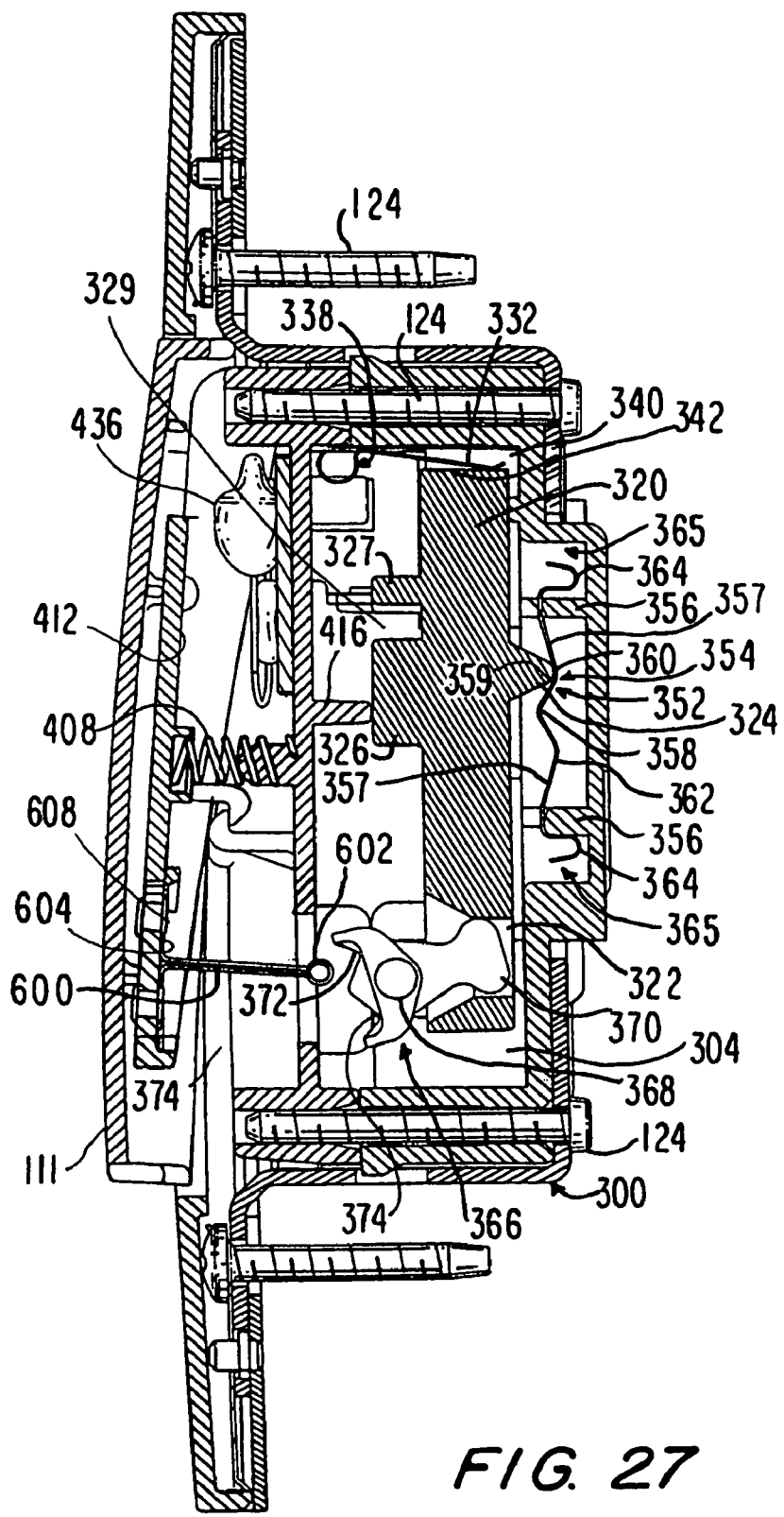
FIG. 27 is a sectional view along the line 24—24 of FIG. 3 where the cam driver is that of FIG. 26.

Referring to FIG. 26, there is shown an exploded view of the switch with another cam driver; and, FIG. 27 is a sectional view along line 24—24 of FIG. 3 where the cam driver is that of FIG. 26. In this embodiment, the articulated cam driver 431 shown in FIG. 19 is replaced with a flexible cam driver with blunt end 600. Flexible cam driver with blunt end 600 is composed of a flat ribbon of flexible material such as spring steel bent back upon itself at its center with a generous radius to form the blunt end 602 having a diameter which fits within the pockets 372, 374 of cam 366. The ends of the flexible cam driver are bent at 90 degrees and each end has an opening for receiving a holding member for attaching the flexible cam driver to the subplate 412. In this embodiment, subplate 412 does not have a cutout 433, but is continuous to provide support for and allow the flexible cam driver 600 to be attached to the subplate. Cam driver 600 can be attached to the subplate with rivets, plastic projections which protrude from the subplate and pass through the openings in the ends of the cam driver and are deformed with heat to secure the cam driver to the subplate, or by any other method. Except for the substitution of the flexible cam driver with blunt end 600 for the articulated cam driver 431 disclosed in FIG. 19, the construction and operation of the switch of the embodiment disclosed in FIGS. 26 and 27 is the same in all aspects as that of the switch disclosed in FIGS. 14–25C.

Figure 28:
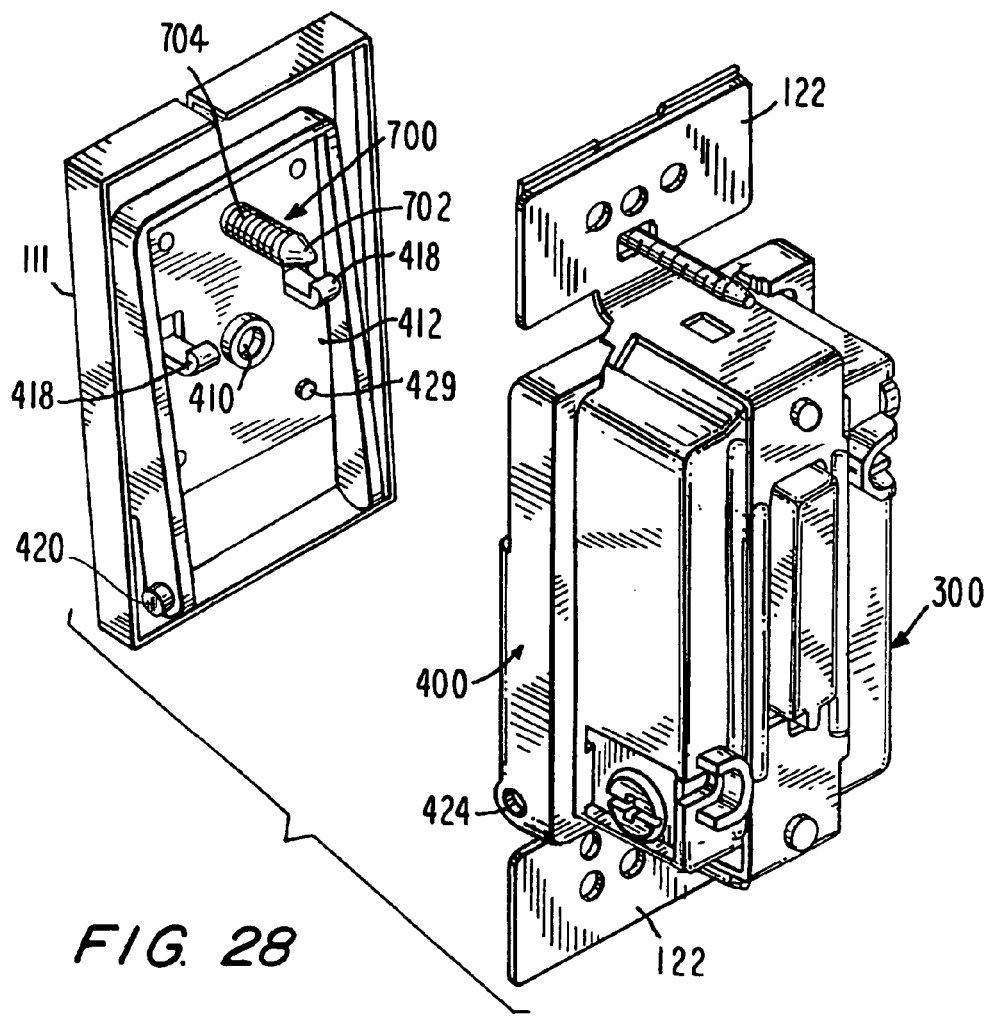
FIG. 28 is a perspective exploded view of the switch with still another cam driver.
Figure 29:
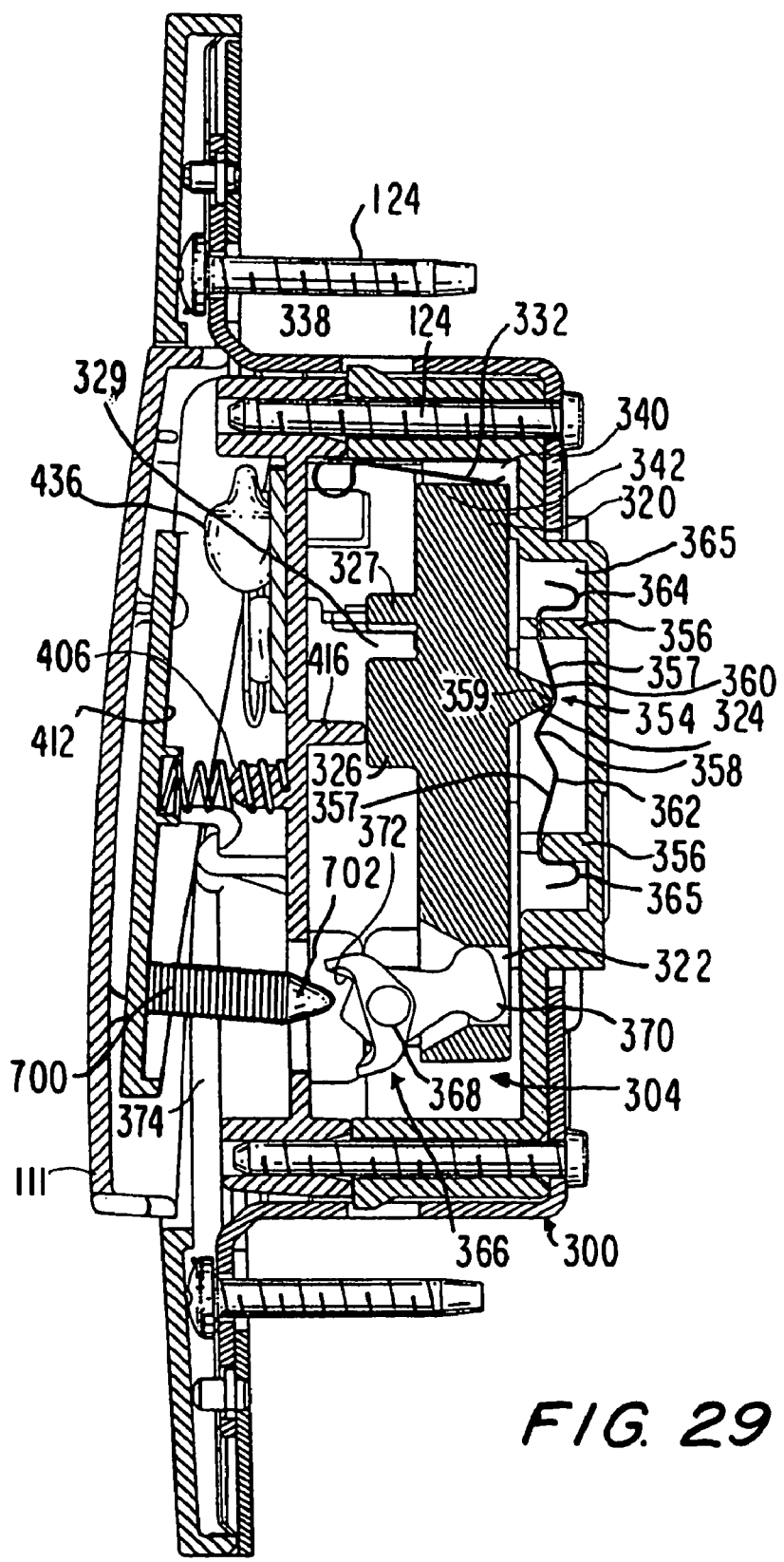
FIG. 29 is a sectional view along the line 24—24 of FIG. 3 where the cam driver is that of FIG. 28.

Referring to FIG. 28, there is shown an exploded view of the switch with still another cam driver, and FIG. 29, is a sectional view along line 24—24 of FIG. 3 where the cam driver is that of FIG. 28. In this embodiment, the articulated cam driver 431 shown in FIG. 19 is replaced with a semiflexible cam driver having a sharp end 700 such as a closely wound coil spring 700 having a conical shaped tip 702. In this embodiment, subplate 412 does not have a cutout 433, but is continuous to provide support for and to allow the semiflexible cam driver 700 to be attached to the subplate. The subplate has a small projection which extends down from the bottom of the subplate and has a diameter the fits snugly within the top end of the closely wound spring. The closely spring 700 is attached to the subplate by being placed over the projection on the subplate. The lower end of the closely wound spring 700 supports a conical shaped tip 702 having a cylindrical back end having a diameter which is substantially equal to that of the inside diameter of the spring 700 and which is inserted into and held securely by the closely wound spring. The very tip of the conical shaped tip 702 has a small diameter which allows it to fit into pockets 372 and 374 of cam 366. Except for the substitution of the semiflexible cam driver with sharp end for the articulated cam driver 431 disclosed in FIG. 19, the construction and operation of the switch of the embodiment disclosed in FIGS. 28 and 29 is the same in all aspects as that of the switch disclosed in FIGS. 14–25C.

Figure 30:
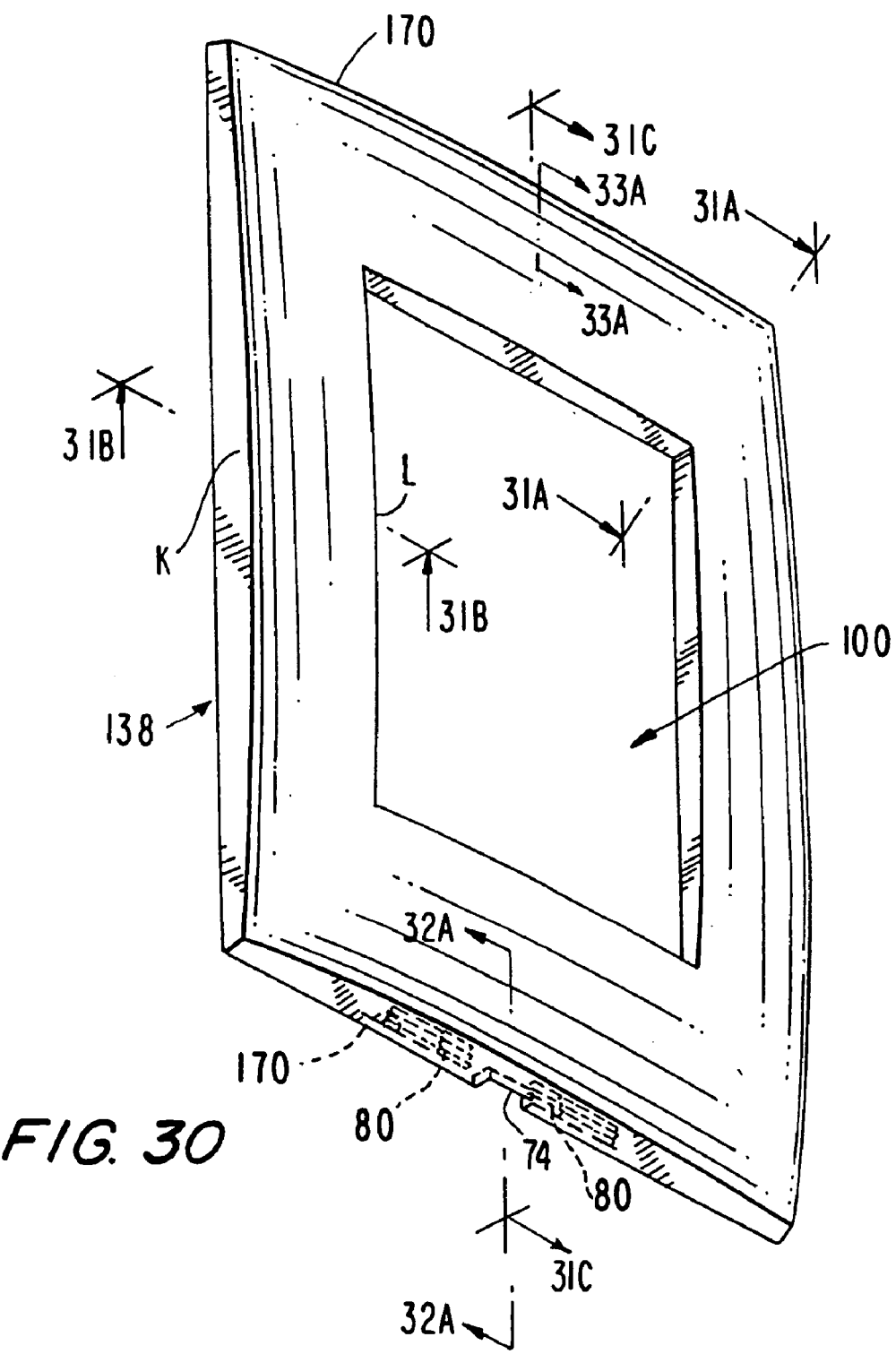
FIG. 30 is a front perspective view of a wall plate for a single wiring device.
Figure 31A:
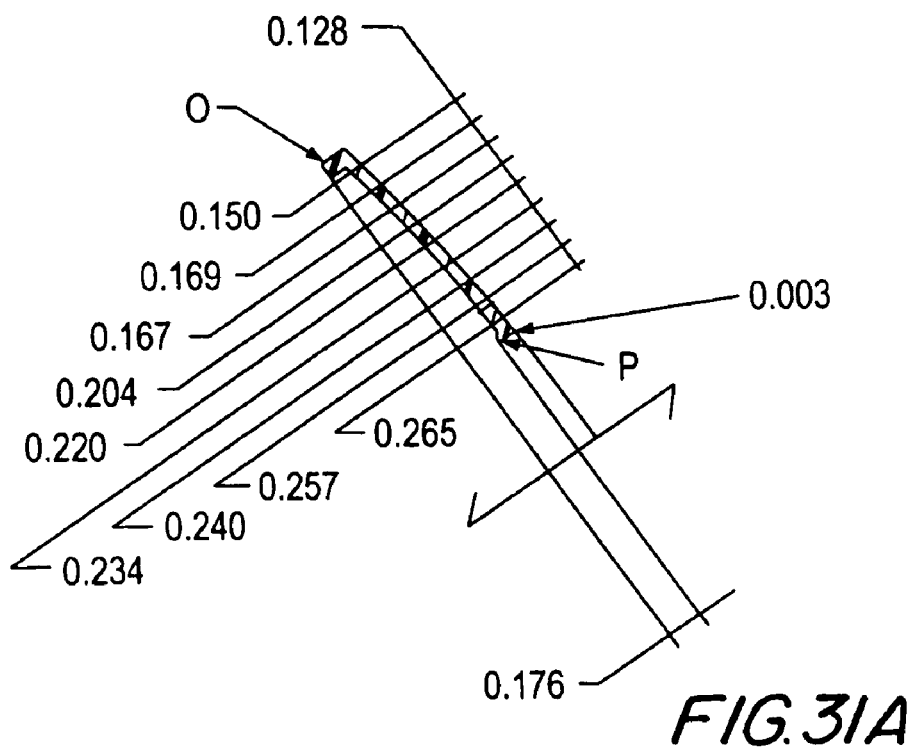
FIGS. 31A–31C are sectional views along the lines 31A—31A to 31C—31C of the wall plate of FIG. 30.
Figure 31B:
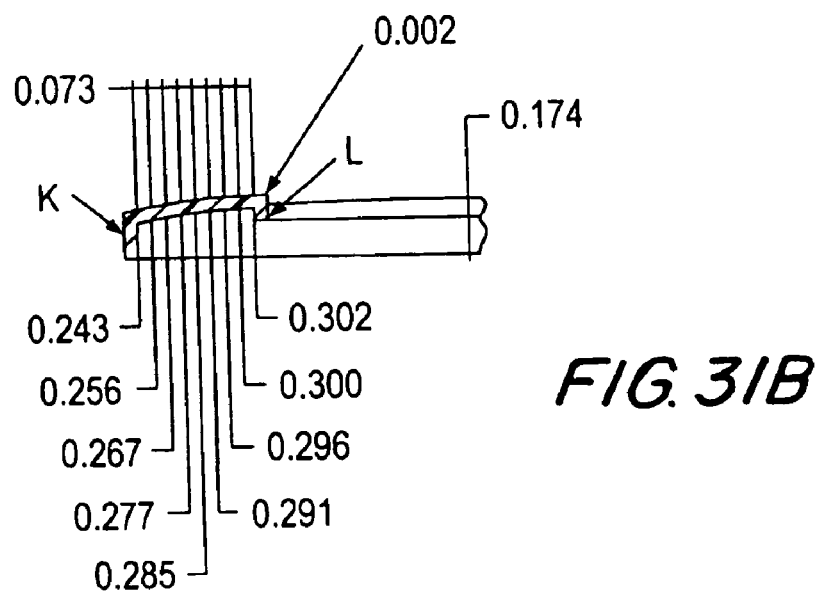
Figure 31C:
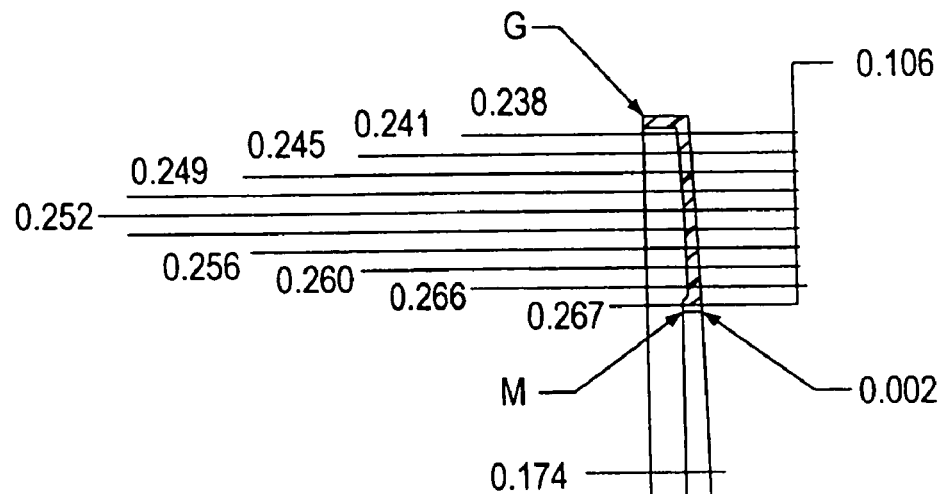
Figure 32:
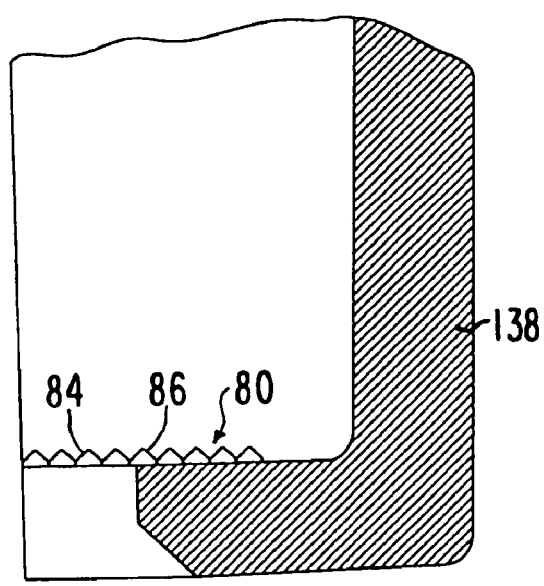
FIG. 32 is a sectional view of the bottom edge of the wall plate along the line 32A—32A of FIG. 30.

Referring to FIGS. 30–35, for a single wiring device, the width of the face of the wiring device is approximately 55% of the width of the wall plate along the horizontal axis and approximately 56% of the length of the wall plate along the vertical axis. When the wiring device is a receptacle, the contour along the width of the receptacle face is flat in one plane and is complex along the length of the face of the receptacle with a constant radius that is greater than 10 inches and less than 40 inches, a preferred radius being substantially 30.724 inches. The shape of the receptacle face is different from that of the switch to allow for the proper seating of an inserted plug. When the wiring device is a switch, its face has a vertical axis along its length and a horizontal axis along its width where the face of the paddle along its vertical axis has a contour of positive first differential comprised of a combination of splines drawn between points of varying distances from a datum plane and zero second differential when the rate of height increase of the individual splines is constant. The horizontal axis has a surface with a contour of a positive first differential and negative second differential comprised of a combination of splines drawn between points of varying distance from a datum plane. Referring to FIG. 30, there is shown a front perspective view of a wall plate for a single wiring device. The wall plate is substantially 4.92 inches in length by 3.28 inches in width and has a single opening 100 with no dividing members for receiving a wiring device, either a switch which has no frame or a receptacle each of which is slightly less than 2.82 inches in length by 1.83 inches in width to fit within the opening 100. The width of the wall plate varies depending upon how many wiring devices are ganged together and located in side-by-side relationship. The front surface of the wall plate here disclosed has a complex or compound contoured shape such that the surface at the opening for the wiring device is further from the wall than it is at the outer edge of the wall plate. Referring to FIG. 31B, there is shown a view along the line 31B—31B of FIG. 30. FIGS. 31A–31C are sectional views along the lines 31A—31A to 31C—31C of the wall plate of FIG. 30 along the horizontal centerline, between point K, the outer right edge, and point L, the inner edge of the opening for the wiring device. As shown in FIG. 31B, the surface lies between two profile boundaries substantially 0.002 inches apart, perpendicular to datum plane A, equally disposed about the true profile and positioned with respect to a datum plane. The basic dimensions and the profile tolerance establish a tolerance zone to control the shape and size of the surface. The surface is about 0.73 inches in width. Within that width, a contour is defined by the dimensions of about ten equidistant points which are about 0.073 inches apart. Each dimension indicates that point's distance to datum plane A, the back (flat) surface of the wall plate, which begins at point K. Moving from left to right, the dimensions increase from about 0.243 to about 0.302 inches. This progression defines a contour of increasing height, positive first differential, when the points are connected by individual splines. The points are not connected by a single arc and the rate at which the contour height increases is not constant. The rate of height increase of the individual splines decreases from left to right, and the second differential of the contour is negative. That is, the difference between the first point's distance dimension and the second is larger than the difference between the second and the third, etc. Thus, the surface has a contour of positive first differential and negative second differential, comprised of a combination of splines drawn between points of varying distance from a datum plane. FIG. 31A is a sectional view along the line 31A—31A of FIG. 30; FIG. 31B is a sectional view along the line 31B—31B of FIG. 30; and FIG. 31C is a sectional view along the line 31C—31C of FIG. 30. FIGS. 31A–C clearly shows the wall plate's contours for sections along lines 31A—31A, 31B—31B and 31C—31C of FIG. 30.

The section along line 31C—31C (see FIG. 31C), which runs along the vertical centerline of the wall plate defines a surface having a positive first differential and zero second differential, comprised of a combination of splines drawn between points of varying distance from a datum plane. This contour has zero second differential because the rate of height increase of the individual splines is constant; the difference between any two sequential point dimensions is substantially 0.0037 inches.

Figure 33:
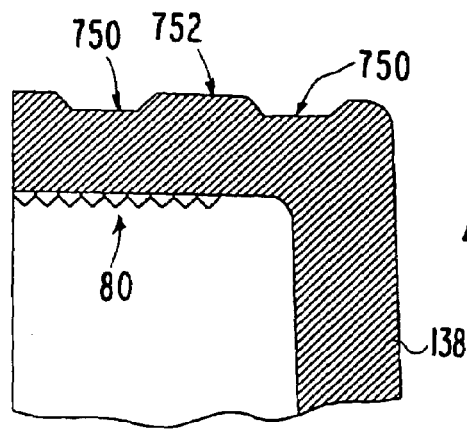
FIG. 33 is a sectional view of the top edge of the wall plate along the line 33A—33A of FIG. 30.
Figure 34:
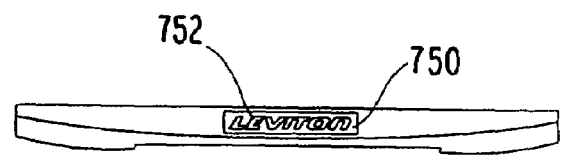
FIGS. 34, 34A are views of the top edge of the wall plate of FIG. 30 showing the channel and identifying structure.
Figure 34A:
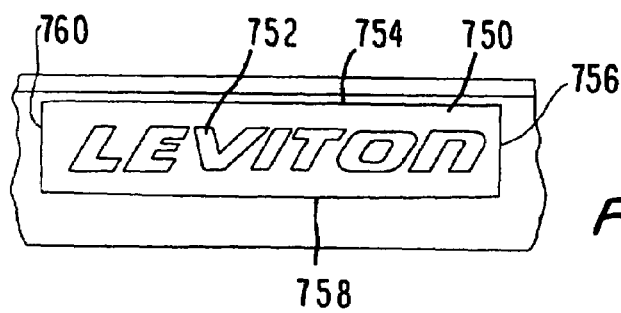

The wall plate 138 for a single wiring device shown in FIG. 30 includes, along the inside top edge, and the inside bottom edge, a plurality of teeth for engagement with the ends of latching pawls 140 of the multi-function clips 130, 151. See FIG. 32 which is a sectional view of the bottom edge of the wall plate along the line 32A—32A of FIG. 30; and FIG. 33 which is a sectional view of the top edge of the wall plate along the line 33A—33A of FIG. 30. The top outside edge (see FIG. 33), has a recessed area such as a channel having raised identifying nomenclature structure such as letters of the alphabet, numbers and/or a symbol which can, for example, identify the manufacturer of the device. Referring to FIG. 33, there is also shown a sectional view along the line E—E of FIG. 30 of the top rail of the wall plate 138. FIGS. 34, 34A show views of a portion of the top edge of the wall plate of FIG. 30 showing the channel and identifying nomenclature structure. In FIGS. 34 and 34A, a channel 217 (see FIG. 33) is formed in the top outside edge of the wall plate. The channel is about three-quarters of an inch in length and has a width which is less than the width of the edge of the rail. As shown in FIGS. 33, 34, 34A, channel 217 is a walled rectangular depression defined by four walls which define the channel. Located within the channel or depression is raised identifying structure such as the name of the manufacturer, i.e., "LEVITON". The height of the raised identifying structure can be 0.010 of an inch where the top surface of the raised identifying structure is substantially flush with the surface of the edge of the wall plate.

When the wiring device of the present invention is a switch, the surface of the paddle of the switch is a continuation of contours of the wall plate, so that their surfaces complement each other. When the wiring device is a receptacle, the contour along the width of the receptacle face is flat in one plane and is complex along the length of the face of the receptacle with a constant radius. The shape of the receptacle face is different from that of the switch to allow for the proper seating of an inserted plug. The wall plate has no exposed mounting screws or other visible metal hardware. When the wall plate is placed around the wiring device, the only visible parts are the wall plate 16 and the switch or receptacle. No fastening means such as screws for holding the wall plate in place are visible.

Figure 35:
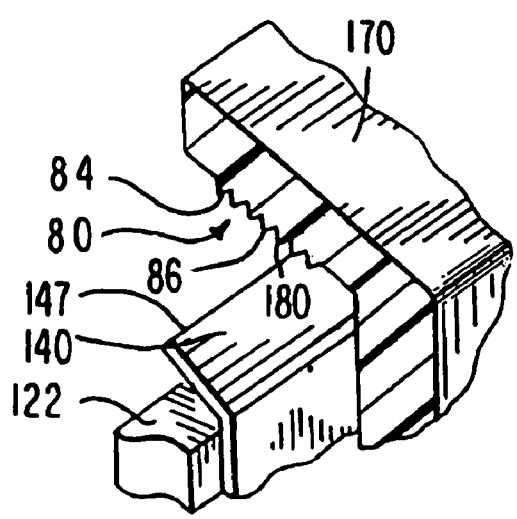
FIG. 35 is a fragmentary, enlarged perspective of the latching pawl of the multi-function clip engaging the tooth rack of the wall plate.

To attach the wall plate 138 to the wiring device, the edges of pawls 140 of the bottom and top clips 130, 151 engage tooth shaped racks 80 located on the inner surfaces of the top and bottom end walls 70 of wall plate 138. There are two racks on each end wall 70 of the wall plate 138. Each rack 80 contains a number of tooth shaped teeth 82 each having an inclined front face 84 and an inclined back face 86. Referring to FIG. 35, which is a fragmentary, enlarged perspective of the latching pawl of the multi-function clip engaging the tooth rack of the wall plate as the end of latching pawl 140 engages the inclined front face 84 of a tooth, the pawl deflects and moves past the tip of the first tooth 82. Once pawl 140 is past the tip of tooth 82, it can return to its initial position and take a position between the inclined back face 86 of first tooth 82 and the inclined front face 84 of a second tooth 82. This operation can be repeated as many times as is needed to position the top and bottom ends of wall plate 138 as close to the wall as possible. As racks 80 and pawls 140 are independently operated, it is possible to position the wall plate 138 to closely follow the wall contour, even when the wall is not flat. This ability to follow the wall contour is even more appreciated when the wall plate 138 is large, such as a wall plate positioned around multiple wiring devices.

Figure 36:
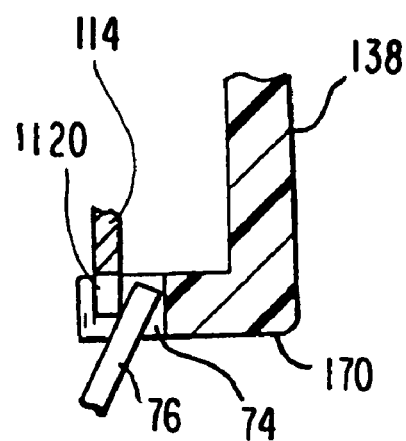
FIG. 36 is a fragmentary, enlarged sectional side view of the wall plate and tab of the alignment plate to indicate how the two components can be separated following latching.

Referring to FIG. 36, there is shown a fragmentary, enlarged sectional side view of the wall plate and tab of the alignment plate to indicate how the two components can be separated following latching. Once the ends of latching pawl 140 is positioned in a valley between two teeth, it becomes difficult to dislodge the wall plate 138 from the pawl 140. To help in the removal of the wall plate a slot 74 is formed in the bottom end 70 of wall plate 138 to provide access to tab 120. A small, flat tool blade such as a screw driver blade 76, or the like, can be moved through slot 74 in end 70 to contact both the outer surface of tab 120 and the back wall of slot 74. By moving the blade 76 using the back wall of slot 74 as a fulcrum, the force applied to tab 120 will separate wall plate 138 from the wiring device. As tool 76 can apply a great deal of force to tab 120, it is possible to separate the pawl 140 from engagement with the teeth and thus the wiring device from the wall plate.

Figure 37:
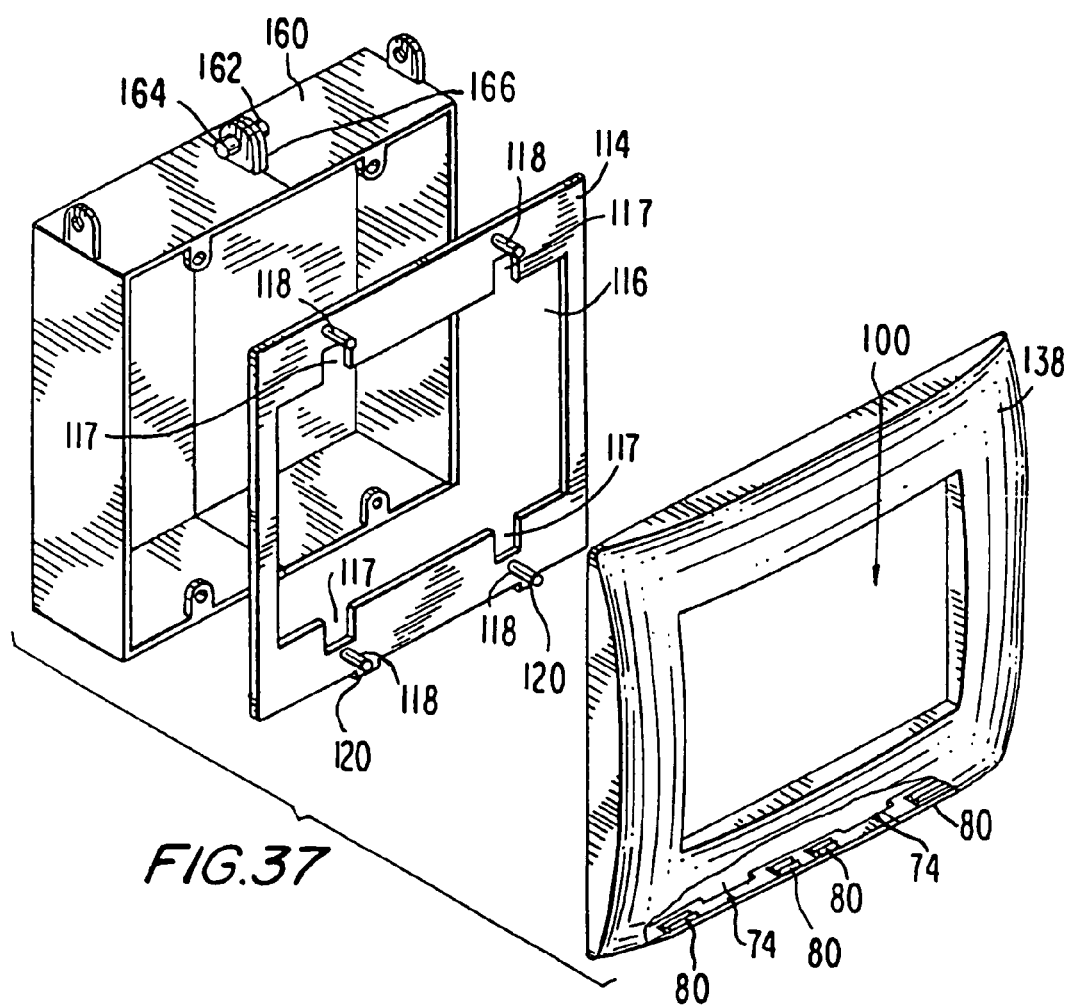
FIG. 37 is an exploded perspective view of a box, alignment plate and wall plate for two wiring devices.

Referring to FIG. 37, there is shown an exploded view of alignment plate and a wall plate for two wiring devices. There is no partition or dividing member located in either the wall plate opening or the alignment plate opening to separate the two wiring devices. The two wiring devices can be placed in a double ganged box 160 made up, for example, of two single boxes joined by fasteners 162 extending through the threaded apertures 164 of two joining ears 166. Alignment plate 114 has a single opening 116, four clearance openings 117 and four alignment pins 170 for receiving two wiring devices such as two switches, a receptacle and a switch, or two receptacles.

Wall plate 138 can have four racks 80 on the interior of the top and bottom end walls for receiving four pawls where the two center racks receive one pawl from each wiring device. Also, there are two tabs 120, which are accessible via slots 74 in end wall 70 of cover plate 138. Because of the independent operation of the pawls 140 with their respective racks 80, the wall plate 138 can compensate somewhat for lack of flatness of the wall in which the wiring devices are installed.

Figure 38:
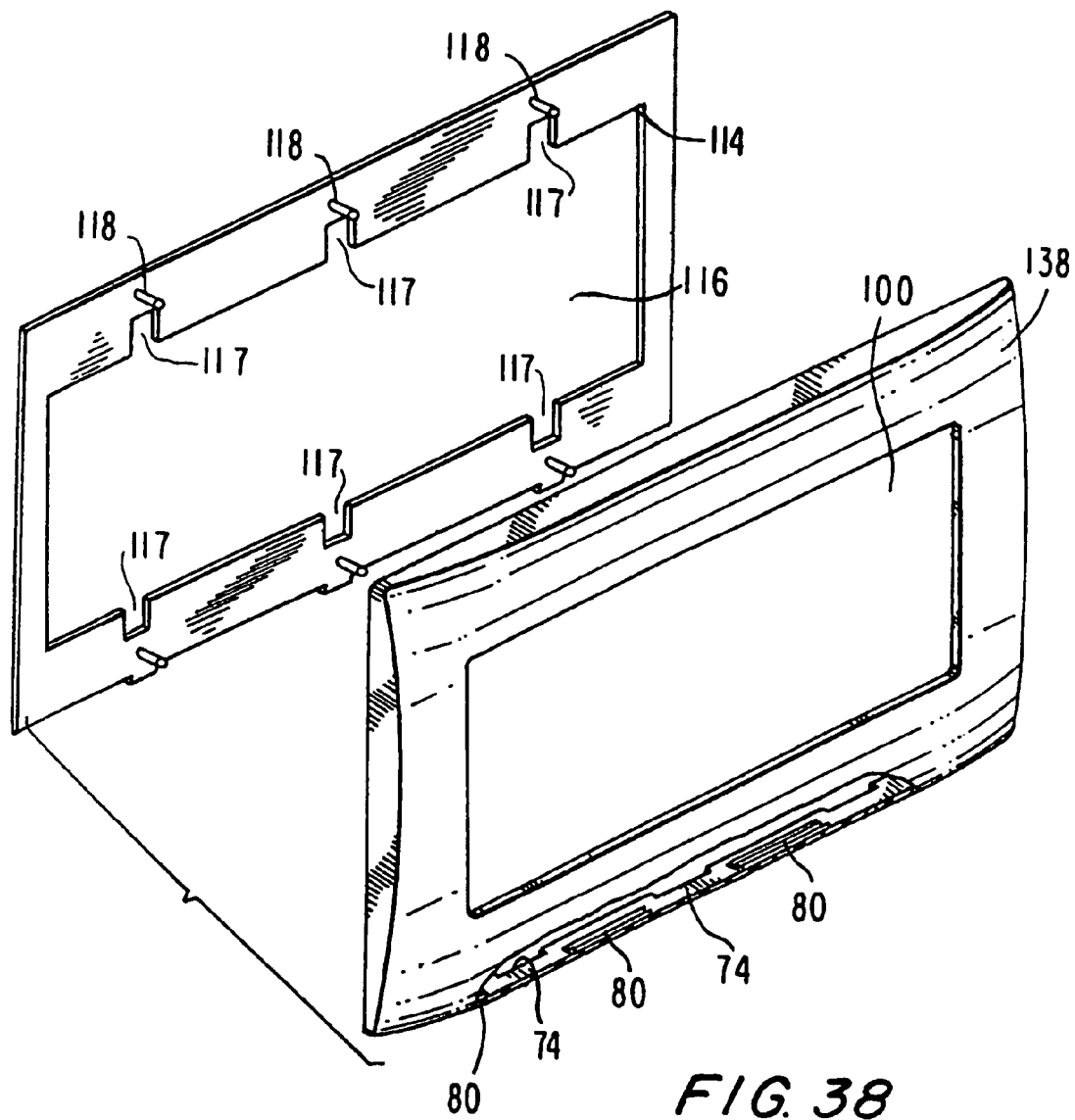
FIG. 38 is an exploded view of alignment plate and wall plate for three wiring devices.

Referring to FIG. 38, there is shown an exploded view of alignment plate 114 having a single opening 116 and a wall plate 138 for three wiring devices mounted in three boxes (not illustrated) ganged together. Wall plate 138 has a single opening 100 with no dividing or separating members for receiving three wiring devices positioned side by side and has four sets of racks 80 where the two end racks each receive a single pawl and the two center racks receive two pawls. Alignment plate 114 has a single opening 116 with no dividing or separating members, three sets of clearance openings 117 and three sets of alignment pins 170 for receiving three wiring devices.

Figure 39:
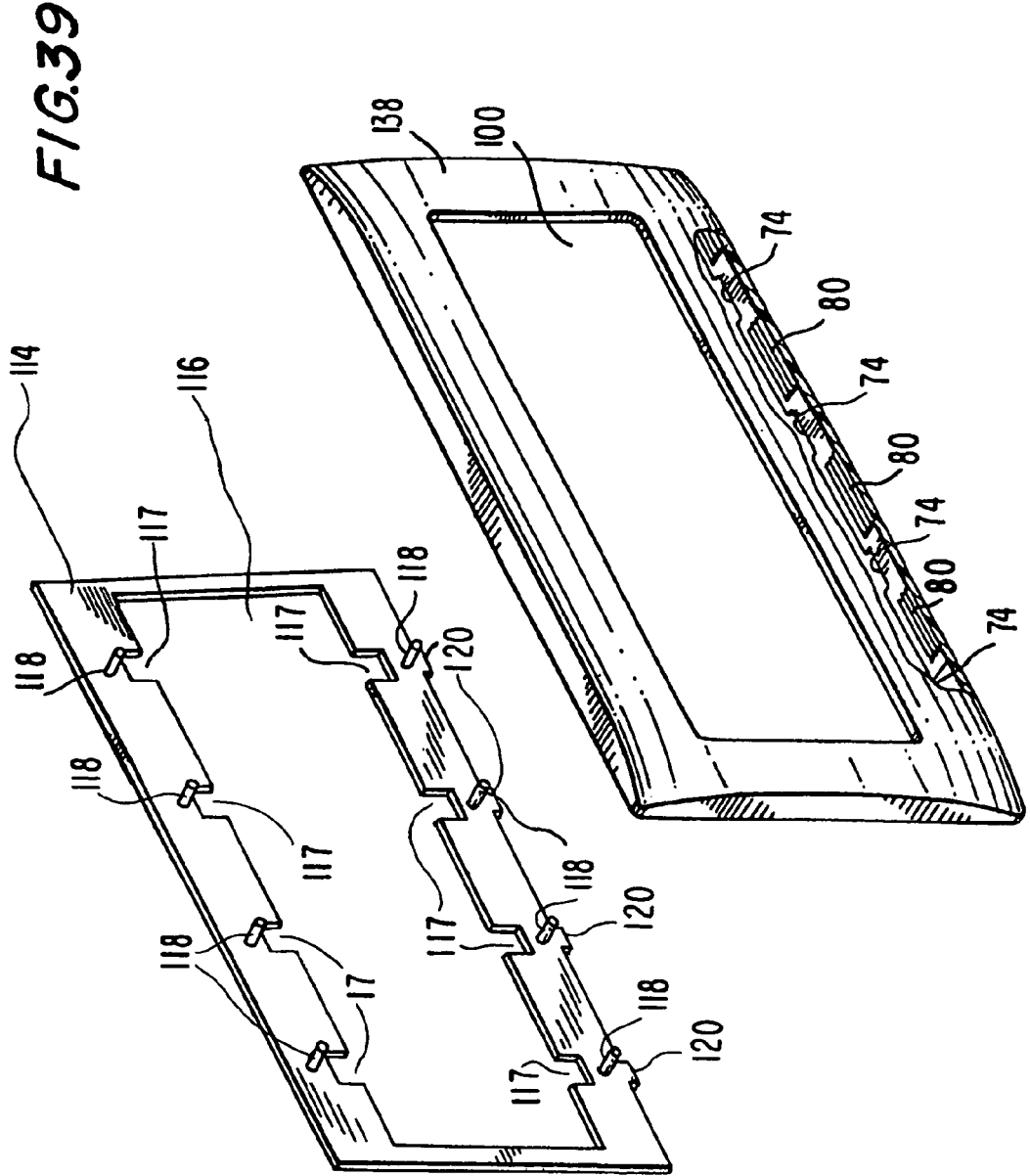
FIG. 39 is an exploded view of alignment plate and wall plate for four wiring devices.

Referring to FIG. 39, there is shown an exploded view of alignment plate 114 having a single opening 116 with no dividing or separating members and wall plate 138 for four wiring devices mounted in four boxes (not illustrated) ganged together. Wall plate 138 has a single opening 100 with no dividing or separating members for receiving four wiring devices positioned side by side and the alignment plate 114 has a single opening 116 with no dividing or separating members for receiving four wiring devices positioned side by side.

Figure 40:
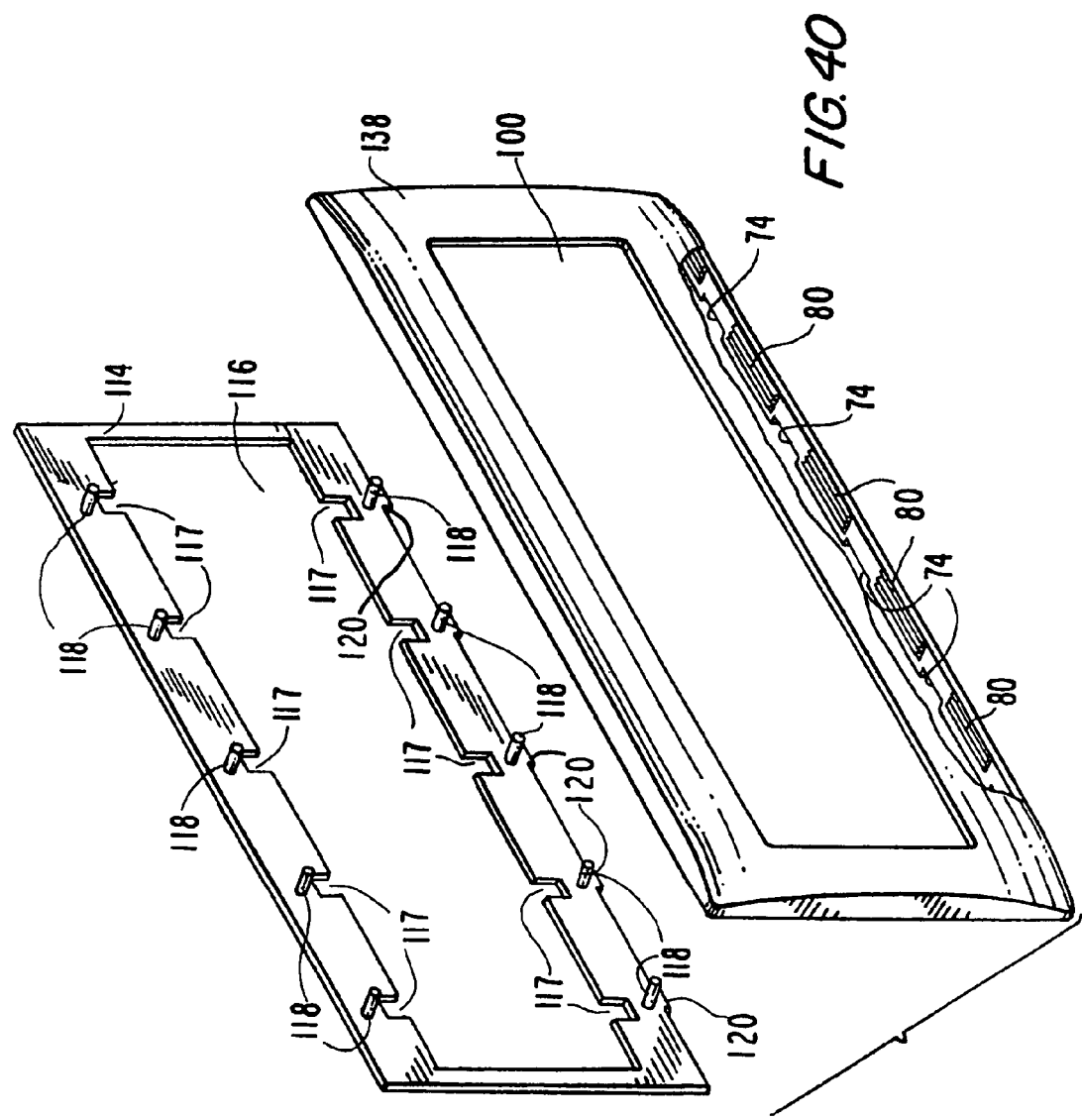
FIG. 40 is an exploded view of alignment plate and wall plate for five wiring devices.

FIG. 40 is an exploded view of alignment plate 114 having a single opening 116 with no dividing or separating members and wall plate 138 having a single opening 100 for five wiring devices mounted in five boxes (not illustrated) ganged together. The single opening 100 in wall plate 138 has no dividing or separating members and the alignment plate 114 has a single opening 116 with no dividing or separating members for receiving five wiring devices positioned side by side.

FIG. 41 is an exploded view of alignment plate 114 having a single opening 116 with no dividing or separating members and wall plate 138 having a single opening 100 for six wiring devices mounted in six boxes (not shown) ganged together. The single opening 100 in wall plate 138 has no dividing or separating members and the alignment plate 114 has a single opening 116 with no dividing or separating members for receiving six wiring devices positioned side by side.

Each wall plate shown in the Figs, can be made of conductive material or of non-conductive material. Where the wall plate is made of non-conductive material such as plastic, a conductive coating can be sprayed, plated, etc. to the front, back or both the front and back surfaces of the wall plate to provide a conductive path from the wall plate to ground through the alignment plate. In those instances where the wall plate is coupled to the wiring device by means other than the alignment plate here shown, such as, for example, with screws etc., then the conductive path from the wall plate to ground is via the means that attaches the wall plate to the wiring device and/or box.

The present invention contemplates a system wherein multiple electrical wiring devices in numbers not expressly set forth hereinabove may be utilized, without departing from the spirit or lawful scope of the invention.

While there have been shown and described and pointed out the fundamental novel features of the invention as applied to the preferred embodiments, it will be understood that various omissions and substitutions and changes of the form and details of the devices illustrated and in their operation may be made by those skilled in the art without departing from the spirit of the invention.

What is claimed is:

1. A switch comprising:
   a housing:
   a rocker paddle pivotally coupled to said housing to assume a first depressed position when subjected to an external force and a second at rest position when not subjected to an external force;
   cam means adapted to alternately rotate in a first direction and a second opposite direction;
   flexible cam driver having an end coupled to be driven by said rocker paddle to urge said cam means to rotate in said first or said second direction;
   slider means coupled to be moved alternately in a first and a second opposite linear direction by rotation of said cam means;
   a stationary contact and a movable contact coupled to said switch housing, said movable contact biased to contact said stationary contact and urged by said slider means to break contact with said stationary contact; and
   a leaf spring within said housing to assist said slider means to move in said first and second directions.

2. The switch of claim 1 wherein said flexible cam driver comprises:
   a flat ribbon of flexible material having a blunt end and coupled to said housing; and
   spring means coupled to urge said rocker paddle to said second at rest position.

3. The switch of claim 2 wherein said blunt end of said flat ribbon of flexible material is positioned to engage said cam means.

4. The switch of claim 2 comprising
   a clearance opening located in a member between said paddle and said cam means for receiving said flat ribbon of flexible material.

5. The switch of claim 4 wherein said clearance opening is elongated.

6. The switch of claim 5 wherein said elongated opening has a long dimension along the length of the switch and a short dimension along the width of the switch.

7. The switch of claim 5 wherein said elongated clearance opening is rectangular.

8. The switch of claim 2 further comprising a ground/mounting strap attached to said housing, said ground/mounting strap providing a cradle like support for holding said switch to a wall box.

9. The switch of claim 8 wherein said ground/mounting strap is made of sheet metal.

10. The switch of claim 1, wherein the slider means comprises a tapered opening for receiving said cam means where rotation of said cam means causes said slider means to move said movable contact.

11. The switch of claim 1, wherein said housing further comprises a base having separate chambers for receiving said slider means and said leaf spring.

12. The switch of claim 11 wherein the chamber for housing said leaf spring has a length greater than that of said leaf spring such that the ends of said spring are not constrained.

13. The switch of claim 11 further comprising front and rear wire clamp means for wire conductors mounted to said housing and coupled to the fixed stationary contact and the movable brush contact.

14. The switch of claim 11 further comprising a window in the rocker paddle to pass light from illumination means in said housing.

15. The switch of claim 14 wherein said illumination means comprises an LED.

16. The switch of claim 1 comprising:
   a surface along the length of said paddle of positive first differential comprised of a combination of splines drawn between points of varying distances from a datum plane.

17. The switch of claim 16 wherein said paddle along its length has a surface of zero second differential comprised of splines drawn between points of varying distance from a datum plane when the rate of height increase of the individual splines is constant.

18. The switch of claim 16 wherein said paddle along its width has a surface of a positive first differential and negative second differential, comprised of a combination of splines drawn between points of varying distances from the datum plane.

19. The switch of claim 16 wherein said paddle along its length has a surface of positive first differential, comprised of splines drawn between points of varying distance from a datum plane and, along its width a surface of a positive first differential and negative second differential, comprised of a combination of splines drawn between points of varying distances from the datum plane.

20. The switch of claim 19 wherein said paddle along its length has a surface of zero second differential comprised of splines drawn between points of varying distances from a datum plane when the rate of height increase of the individual splines is constant.

21. The switch of claim 16 wherein the paddle is not within a frame.

22. A switch comprising:
   a housing;
   a rocker paddle pivotally coupled to said housing to assume a first depressed position when subjected to an external force and a second at rest position when not subjected to an external force;
   cam means adapted to alternately rotate in a first and second opposite direction;
   flexible cam driver having a blunt end coupled to be driven by said rocker paddle to drive said cam means in said first or second direction when said rocker paddle is subjected to an external force;
   spring means coupled to urge said paddle to its second position;
   slider means coupled to be moved alternately in a first and a second opposite direction by said cam means;
   a stationary contact and a movable contact coupled to said housing, the movable contact biased to contact said stationary contact and urged by said slider means to break contact with said stationary contact;
   a leaf spring within said housing to assist said slider means to move in said first and second directions; wherein
   said leaf spring is substantially symmetrical about a central apex and having on each side of said apex a relatively short cam portion which extend downward from the apex where, at the end of each short cam portion there is an upward extending member which forms a depression there between; and wherein each upward extending member rests on support means and the end of each upward extending portion beyond the support means is bent downward.

23. A switch comprising:

a housing:

a rocker paddle pivotally coupled to said housing to assume a first depressed position when subjected to an external force and a second at rest position when not subjected to an external force;

cam means adapted to alternately rotate in a first and second opposite direction;

flexible cam driver having a blunt end coupled to be driven by said rocker paddle to drive said cam means in said first or second direction when said rocker paddle is subjected to an external force;

spring means coupled to urge said paddle to its second position;

slider means coupled to be moved in a first and a second opposite direction by said cam means;

a stationary contact and a movable contact coupled to said housing, said movable contact biased to contact said stationary contact and urged by said slider means to break contact with said stationary contact;

a leaf spring within said housing to assist said slider means to move in said first and second directions; wherein said leaf spring is substantially symmetrical about a central apex and having on each side of said apex a relatively short cam portion which extend downward from the apex where, at the end of each short cam portion there is an upward extending member which forms a depression there between; and wherein each upward extending member rests on support means and the end of each upward extending portion beyond the support means is bent downward; and said switch housing further including a switch base having separate chambers therein for individually housing the slider means and the cam shaped leaf spring.

24. The switch of claim 23 wherein said paddle along its length has a surface of positive first differential comprised of a combination of splines drawn between points of varying distances from a datum plane.

25. The switch of claim 24 wherein said paddle along its length has a surface of zero second differential comprised of splines drawn between points of varying distance from a datum plane when the rate of height increase of the individual splines is constant.

26. The switch of claim 24 wherein said paddle along its width has a surface of a positive first differential and negative second differential, comprised of a combination of splines drawn between points of varying distances from the datum plane.

27. The switch of claim 24 wherein said paddle along its length has a surface of positive first differential, comprised of splines drawn between points of varying distance from a datum plane, and along its width a surface of a positive first differential and negative second differential, comprised of a combination of splines drawn between points of varying distances from the datum plane.

28. The switch of claim 27 wherein the paddle along its length has a surface of zero second differential comprised of splines drawn between points of varying distances from a datum plane when the rate of height increase of the individual splines is constant.

29. The switch of claim 24 wherein the paddle is not within a frame.

* * * * *